US008260872B1

(12) United States Patent
Smaidris et al.

(10) Patent No.: US 8,260,872 B1
(45) Date of Patent: Sep. 4, 2012

(54) MODBUS SIMULATION SYSTEM AND ASSOCIATED TRANSFER METHODS

(75) Inventors: Thomas F. Smaidris, Melbourne, FL (US); R. Brent Saunders, Indian Harbour Beach, FL (US)

(73) Assignee: Data Flow Systems, Inc., Melbourne, FL (US)

( * ) Notice: Subject to any disclaimer, the term of this patent is extended or adjusted under 35 U.S.C. 154(b) by 0 days.

(21) Appl. No.: 13/431,561

(22) Filed: Mar. 27, 2012

Related U.S. Application Data

(60) Provisional application No. 61/468,924, filed on Mar. 29, 2011.

(51) Int. Cl.
*G06F 15/16* (2006.01)
*G06F 12/00* (2006.01)

(52) U.S. Cl. ........................................ 709/208; 709/250

(58) Field of Classification Search .......... 709/208–211, 709/221, 248, 250
See application file for complete search history.

(56) References Cited

U.S. PATENT DOCUMENTS

| | | | | |
|---|---|---|---|---|
| 6,205,567 | B1 * | 3/2001 | Maruyama | 714/741 |
| 2010/0118895 | A1 * | 5/2010 | Radulescu | 370/503 |
| 2011/0306986 | A1 * | 12/2011 | Lee et al. | 606/130 |

* cited by examiner

*Primary Examiner* — Zarni Maung
(74) *Attorney, Agent, or Firm* — Mark R. Malek, Esq.; Zies Widerman & Malek

(57) ABSTRACT

A data transmission system may include a master node and a slave node. Both the master node and the slave node may comprise modbus simulators. The master node may initialize by receiving register data into its status repository from a status repository on the slave modbus simulator. After initialization, historical events may be transmitted from a historical repository of the slave modbus simulator to a historical repository of the master modbus simulator.

44 Claims, 17 Drawing Sheets

US 8,260,872 B1

MODBUS SIMULATION SYSTEM AND ASSOCIATED TRANSFER METHODS

RELATED APPLICATIONS

This application claims the benefit of U.S. Provisional Patent Application Ser. No. 61/468,924 filed on Mar. 29, 2011 titled Modbus Simulator System and Associated Transfer Methods, by the inventors of the present application, the entire contents of which are incorporated herein by reference.

FIELD OF THE INVENTION

The present invention relates to the field of network communications and, more specifically, to the field of systems and methods for simulating the Modbus protocol to improve speed and reliability of existing devices that utilize it.

BACKGROUND OF THE INVENTION

For several years Modicon's Modbus serial communications protocol has been the de facto standard for use in connecting industrial electronic devices. Modbus has been used in a vast variety of implementations where instructions must be sent from a supervisory or "master" station to a number of "slave" devices, wherein the values of memory registers associated with each slave device may be set or retrieved by the master station. Such configurations are commonly referred to as Supervisory Control and Data Acquisition (SCADA) systems. An illustrative Modbus implementation 70 is illustrated as a block diagram in FIG. 1, as contemplated by the relevant prior art.

In the illustrative Modbus implementation 70, a master station 72 is in electronic communication with one or more slave devices 71. The connection between the master station 70 and the slave devices 71, and optionally between additionally connected slave devices 71, is provided by a standard Modbus connection 73. Often, the standard Modbus connection 73 between the master station 72 and slave devices 71 is provided by a radio signal or a twisted pair cable. There are many limitations inherent in using these types of connections.

For example, the data transmission speed achievable for a typical Modbus system is inversely proportional to the length of the cable for the standard Modbus connection 73. As a result, the only way to achieve maximum data transmission rates of about 35 Mbps require the cable for the Modbus connection must be kept under 10 meters in length. Above 10 meters, the maximum possible transmission speed drops quickly as the length is increased, with 100 Kbps as the maximum achievable speed at 1,200 meters (i.e., less than 0.3% of the 10 meter rate). Also, since all data requests are initiated by the slave devices 71, current Modbus implementations of the prior art can only react to changes in register values that occur slower than the amount of time necessary to query all slave devices 71. This functional limitation, combined with the speed decreases inherent in longer cable lengths, make exception- or alarm-type event handling very difficult. As another limitation, the number of devices that can be attached to a typical Modbus system is limited to 247, based on the addressing standard dictated by the protocol.

Accordingly, the size and scope of the Modbus implementations of the prior art are severely restricted by the limitations of the currently available hardware, making the Modbus protocol an inappropriate vehicle for large-scale or municipal implementation. As a result, much time, effort, and expense have been committed to redesigning and rebuilding devices that can be used for larger scale systems, such as SCADA systems. Given the vast number of industrial devices and sensors that are already configured to work with the Modbus protocol, however, it would be advantageous to have a solution that would function with existing devices, while improving the capabilities of the data transmission network.

Other inventors have combined Modbus technology with newer network devices in an attempt to overcome some of these limitations. These solutions, however, only provide the ability to connect multiple Modbus networks to one or more computing devices using a Local Area Network (LAN), Wide Area Network (WAN), or the like. These attempts to address the shortcomings of Modbus technology do not effectively overcome limitations associated with data query speeds or enable preferred event handling models, such as exception- or alarm-based ones.

SUMMARY OF THE INVENTION

The present invention is directed to a system and methods that advantageously allows for the ready transmission of data between a master node and one or more slave nodes. The present invention also advantageously enhances data transmission so as to reduce time necessary to transmit large amounts of data. The present invention further advantageously provides the ability to transmit large amounts of data over a relatively slow speed connection in over lower time frames. The present invention still further advantageously provides a data transfer system and methods that is self configurable.

These and other objects, features and advantages, according to embodiments of the present invention, are provided by a data transmission system comprising a master node and a slave node. The master node includes a master modbus simulator, a host system in communication with the master modbus simulator, and a communication interchange in communication with the master modbus simulator. The slave node comprises a slave modbus simulator, a communication interchange in communication with the slave modbus simulator, and a modbus device in communication with the slave modbus simulator.

The slave modbus simulator may include a status repository to store register data reported by the modbus device, and a historical repository that stores historical events. Historical events may be defined as register data that is stored on the status repository that has changed. Similarly, the master modbus simulator may include a status repository to store the register data received from the slave modbus simulator and a historical repository to store the historical events received from the slave modbus simulator. In other words, the register repository is adapted to receive that register data which has changed since the last time that the register data was transmitted from the slave modbus simulator to the master modbus simulator. The communication interchange of the slave node is in communication with the communication interchange of the master node. The master node may be configured by transmitting a query from the host system to the master modbus simulator to determine the register data that is required from the modbus device connected to the slave modbus simulator. The master node may be initialized by receiving the register data into the status repository on the master modbus simulator from the status repository on the slave modbus simulator. The register data may be related to a status of the modbus device. After the master node is configured and initialized, the historical events may be transmitted from the historical repository of the slave modbus simulator to the historical repository of the master modbus simulator.

The communication interchange of the slave node may be in communication with the communication interchange of the master node over a low speed connection, and the modbus device may be in communication with the slave modbus simulator over a high speed connection. The high speed connection may be provided by a network connection or a serial connection. The master modbus simulator may transmit a synchronization request to the slave modbus simulator. The historical events stored in the historical repository of the salve modbus simulator may be transmitted to the master node to be stored on the historical repository of the master modbus simulator responsive to the synchronization request. In some embodiments of the system according to the present invention, the historical events that are transmitted from the historical repository of the slave modbus simulator to the historical repository of the master modbus simulator may be limited to the historical events that have occurred since a previous synchronization request has occurred.

The communication interchange of the slave node and the communication interchange of the master node may be provided by a radio. The slave modbus simulator may request register data from the modbus device and stores the register data on the status repository of the slave modbus simulator. The slave node may comprise a plurality of slave nodes, and a plurality of modbus devices may be in communication with each of the slave nodes. The system according to an embodiment of the present invention may include a radio repeater to extend reception of data transmitted between the master node and the slave node. Alternately, communication between the master node and the slave node may be carried out using a wireless mesh network.

The historical events may be transmitted from the historical repository of the slave modbus simulator to the historical repository of the master modbus simulator at set intervals. The historical events that are transmitted from the historical repository of the slave modbus simulator to the historical repository of the master modbus simulator may be limited to the historical events that have occurred since a previous interval. Some embodiments of the present invention contemplate that multiple modbus devices may be in communication with the slave modbus simulator using serial connections. In such embodiments, a modbus simulator may be operable as a master modbus simulator when receiving data from a modbus simulator of a slave node, and may be operable as a slave modbus simulator when transmitting data to a master node. The register data that is stored on the status repository is stored on a status repository that is reserved for register data that has been received at the master node after receiving the register data from the slave node. Transmission of the register data stored on the status repository that is reserved for the register data that has been received at the master node may cause the master node to become the slave node.

A method aspect of the present invention is for transmitting data. The method may include receiving register data from a modbus device in communication with a slave modbus simulator through a communication interchange. The register data may be received at a status repository of the slave modbus simulator from the modbus device connected to the slave modbus simulator carried by a slave node. The status repository of the slave modbus simulator may store the register data reported by the modbus device, and the slave modbus simulator may include a historical repository to store historical events that are defined as changes to the status repository. The method may further include configuring the master node by transmitting a query from the host system to the master modbus simulator to determine the register data that is required from the modbus device connected to the slave modbus simulator. The method may also include initializing the master node by receiving the register data received from the slave modbus simulator. The method may further include transmitting the historical repository of the slave modbus simulator to the historical repository of the master modbus simulator after the master node is initialized. The communication interchange of the slave node may be in communication with the communication interchange of the master node. The register data may be related to a status of the modbus device.

DETAILED DESCRIPTION OF THE INVENTION

Figure 1:
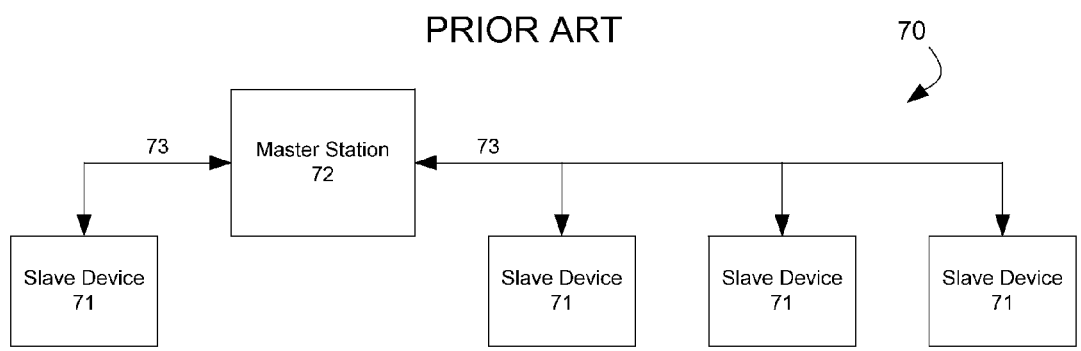
FIG. 1 is a block diagram of an illustrative Modbus implementation according to the prior art.

A modbus simulation system 10 will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, direction, and such without departing from the principles of the present invention.

Embodiments of the present invention are described herein using the context of a system of computers, servers, and software. Those of ordinary skill in the art will realize that the following embodiments of the present invention are only illustrative and are not intended to be limiting in any way. Other embodiments of the present invention will readily suggest themselves to such skilled persons having the benefit of this disclosure.

In accordance with embodiments of the present invention, the components, process steps, and/or data structures may be implemented using various types of operating systems, computing platforms, computer programs, and/or general purpose machines. In addition those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

The computer program, according to an embodiment of the present invention, is a computerized system that requires the performance of one or more steps to be performed on or in association with a computerized device, such as, but not limited to, a server, a computer (i.e., desktop computer, laptop computer, netbook computer, or any machine having a processor), a dumb terminal that provides an interface with a computer or server, a personal digital assistant, mobile communications device, such as a cellular phone, smart phone, or other similar device that provides computer or quasi-computer functionality, or a mobile document reader, which provides reader functionality that may be enabled, through either internal components or connecting to an external computer, server, or global communications network (such as the Internet), to take direction from or engage in processes which are then delivered to the mobile reader. It should be noted that the method aspects of the present invention are preferably computer-implemented methods and, more particularly, at least one step is preferably carried out using a computerized device.

Figure 2:
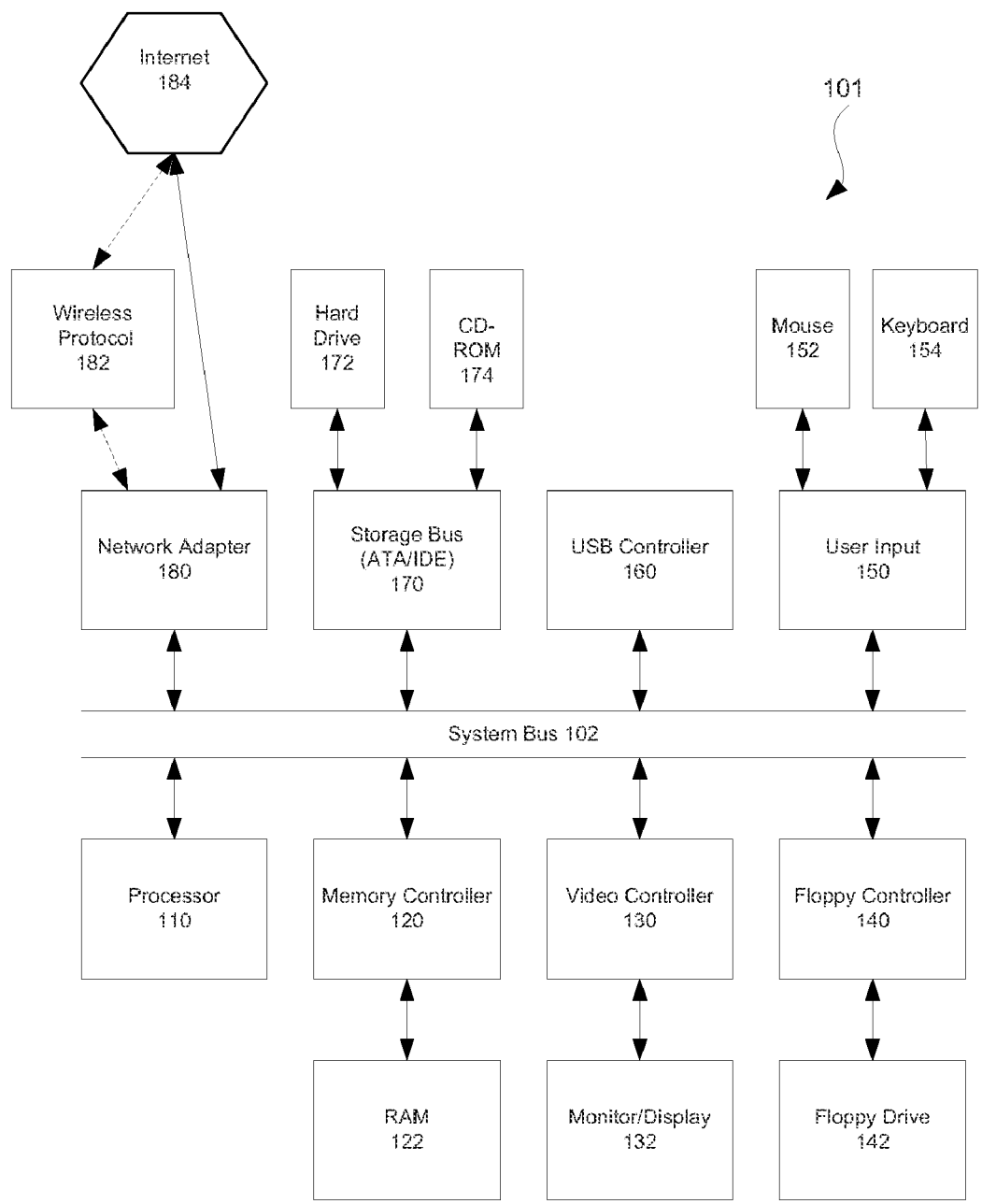
FIG. 2 is a block diagram of a typical computer system used to manage, transmit, and receive data in the present invention.

FIG. 2 is a block diagram of a typical computer system 101 that is suitable for use as a user interface on a host system 82 and/or a Modbus simulator 87. A system bus 102 is comprised of a plurality of signal lines for conveying electronic signals further comprising addressing, data, and control systems between a processor 110 and other various electronic components of computer system 101. A memory controller 120 is coupled to the system bus 102 and provides access to the random access memory (RAM) 122, further providing program instruction storage and working memory for the processor 110. Additionally, a video controller 130 attaches to the system bus 102, which interfaces with and provides output connections to a monitor/display 132 that provides visual feedback to a user interacting with the computer system 101. Further, a floppy controller 140 may be attached to the system bus to provide bi-directional access to a floppy drive 142, which can be used to store user data or custom boot parameters on a removable floppy diskette.

As further shown in FIG. 2, the user input interface 150 attaches to the system bus 102, allowing the user to input commands to the computer system 101 via a mouse 152, keyboard 154, or other input peripherals. Computer system 101 may further include a universal serial bus (USB) controller 160 to allow communication between the system bus 112 and external electronic peripherals. In an alternate configuration, mouse 152 and keyboard 154 may be attached via USB controller 160. Additionally, a storage bus 170 may bi-directionally couple a hard disk 172, which may be comprised of rotating magnetic platters, solid state memory modules, other storage technologies, or any combination of any of the aforementioned storage technologies. Finally, a network adapter 180 may be provided for bi-directionally coupling the computer system 101 to a network. This network connection may be accomplished via wired or wireless protocols, operating at a multitude of frequencies known within the art.

Figure 3:
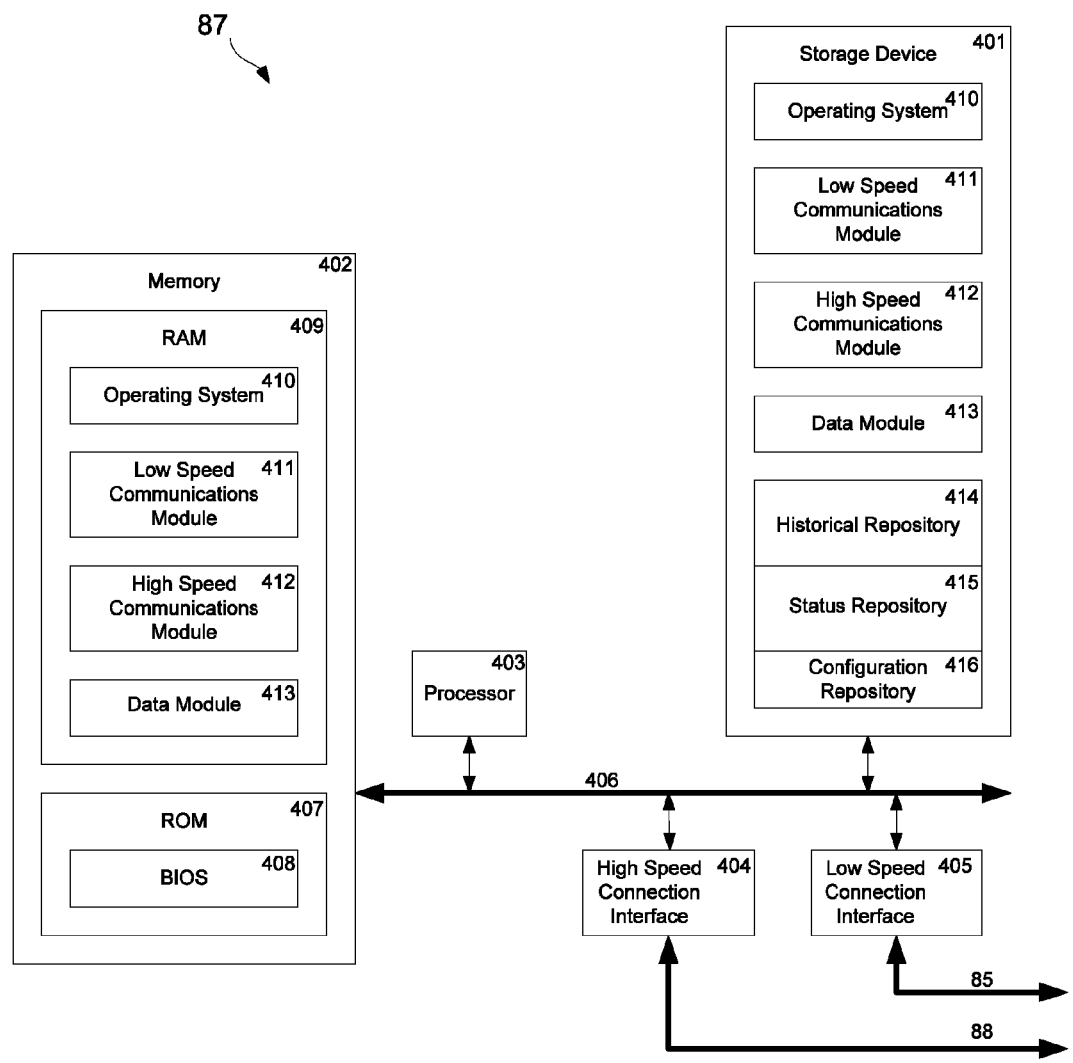
FIG. 3 is a block diagram of a Modbus simulator according to embodiments of the present invention.

FIG. 3 is a block diagram illustrating an embodiment of one hardware implementation of a Modbus simulator 87. A person of skill in the art will appreciate that additional hardware configurations may be used to construct the Modbus simulator 87 and still operate within the scope of the various embodiments of the invention, as disclosed herein. In this embodiment, the Modbus simulator 87 may generally include a node storage device 401, a node memory 402, a node processor 403, a high speed connection interface 404, and a low speed connection interface 405. These components may be connected via a node bus 406.

The node storage device 401 may include a node low speed communications module 411, which may communicate with another Modbus simulator 87 via the low speed connection 85. The node storage device 401 may also include a high speed communications module 412, which may communicate with connected devices using the Modbus protocol via the high speed connection 88. The node storage device 401 may further include a node data module 413, which may include registers used within the operation of the invention, and a historical data repository 414, which may store events or changes in the status of the connected Modbus devices 89.

More specifically, events or changes are defined as any change to the register data associated with the modbus device connected to the slave node. In other words, the slave modbus simulator receives register data from the modbus device that is connected to the modbus simulator. The master modbus simulator may poll the slave modbus simulator for particular registers. This may be referred to as configuration, i.e., the master modbus simulator may poll the slave modbus simulator for the data related to "register 6, bit 8," used for example only and not meant to be limiting. During configuration, the slave modbus simulator will transmit to the master modbus simulator the data associated with "register 6, bit 8" responsive to a request from the host system associated with the master node. To enhance the transmission of data according to embodiments of the present invention, the slave modbus simulator will make note of changes to the register data associated with "register 6, bit 8" and will only transmit these changes, i.e., events, to the master modbus simulator responsive to a polling request. If there have been no changes to "register 6, bit 8" then no data will be transmitted to the master modbus simulator. It is to be understood by those skilled in the art that although the description of the present invention includes a status repository, a historical repository and a configuration repository, the present invention contemplates these repositories being stored on the same database, on separate databases, or on a combination of databases.

The node storage device 401 may still further include a status repository 415, which may store the present status of register data of the connected Modbus devices 89, and a configuration repository 416, which may store the setting and configurations that determine and affect the operation of the Modbus simulation system 10. The configuration repository 416 may store the data that is requested by the host, i.e., the register data that the host system desires the master modbus simulator poll the slave modbus simulator for. Similarly, a node memory 402 may also include a low speed communication module 411, a high speed communications module 412, and a node data module 413, which may be held within the node memory 402 node random access memory (RAM) 409. The node memory 402 may additionally comprise a read only memory module (ROM) 407, which may store the node BIOS 408, or the basic operational instructions for the Modbus simulator 87.

A number of program modules may be stored within the node storage devices 401 and within the node memory 402, such as, for example, a node operating system 410. While the foregoing describes the embodiments of the invention in terms of modules, by way of example, as one of ordinary skill in the art will recognize, after having the benefit of this disclosure, the operations associated with embodiments of the invention need not be modularized and, instead, may be intermingled or written in other non-modular formats. It would also be recognized that one or more of the above-referenced modules might be provided in the form of integrated logic circuits, rather than software instructions to be executed by a processor, or other electronic processing device.

Figure 3A:
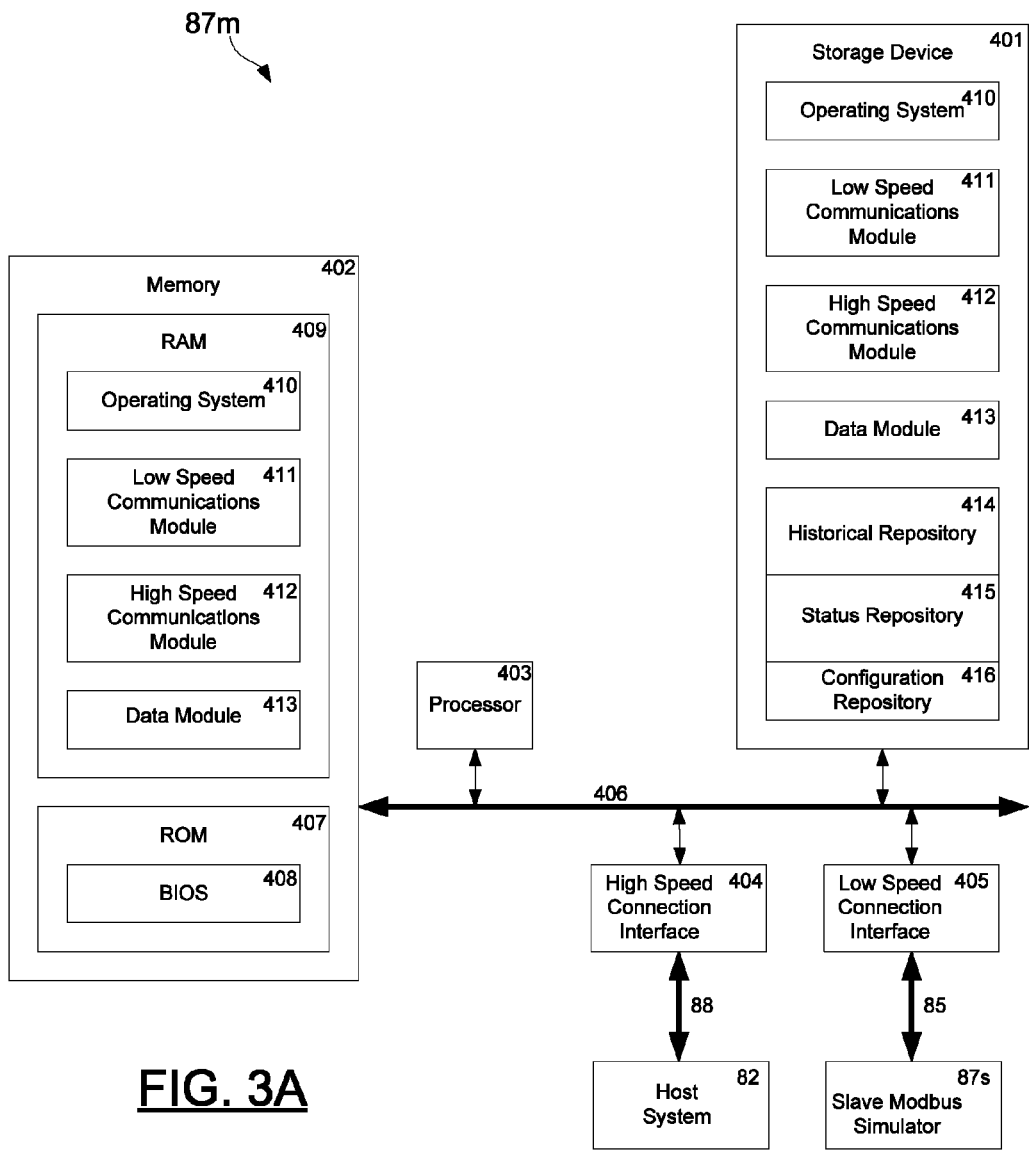
FIG. 3A is an embodiment of FIG. 3 depicting the Modbus simulator in a master node.

Reference is now made to FIG. 3A, which provides a block diagram illustrating a Modbus simulator 87*m* as it may be present in the master node 80. In addition to the components previously discussed regarding the Modbus simulator 87 of FIG. 3, the Modbus simulator 87*m*, as it may be present in the master node 80, may connect to a host system 82 via the high speed connection 88, which will be described in greater detail in the paragraphs that follow. Likewise, the Modbus simulator 87*m* of FIG. 3A, as it may be present in the master node 80, may be connected to a Modbus simulator 87*s* in the slave node 81, which will be discussed in greater detail in the paragraphs that follow.

Figure 3B:
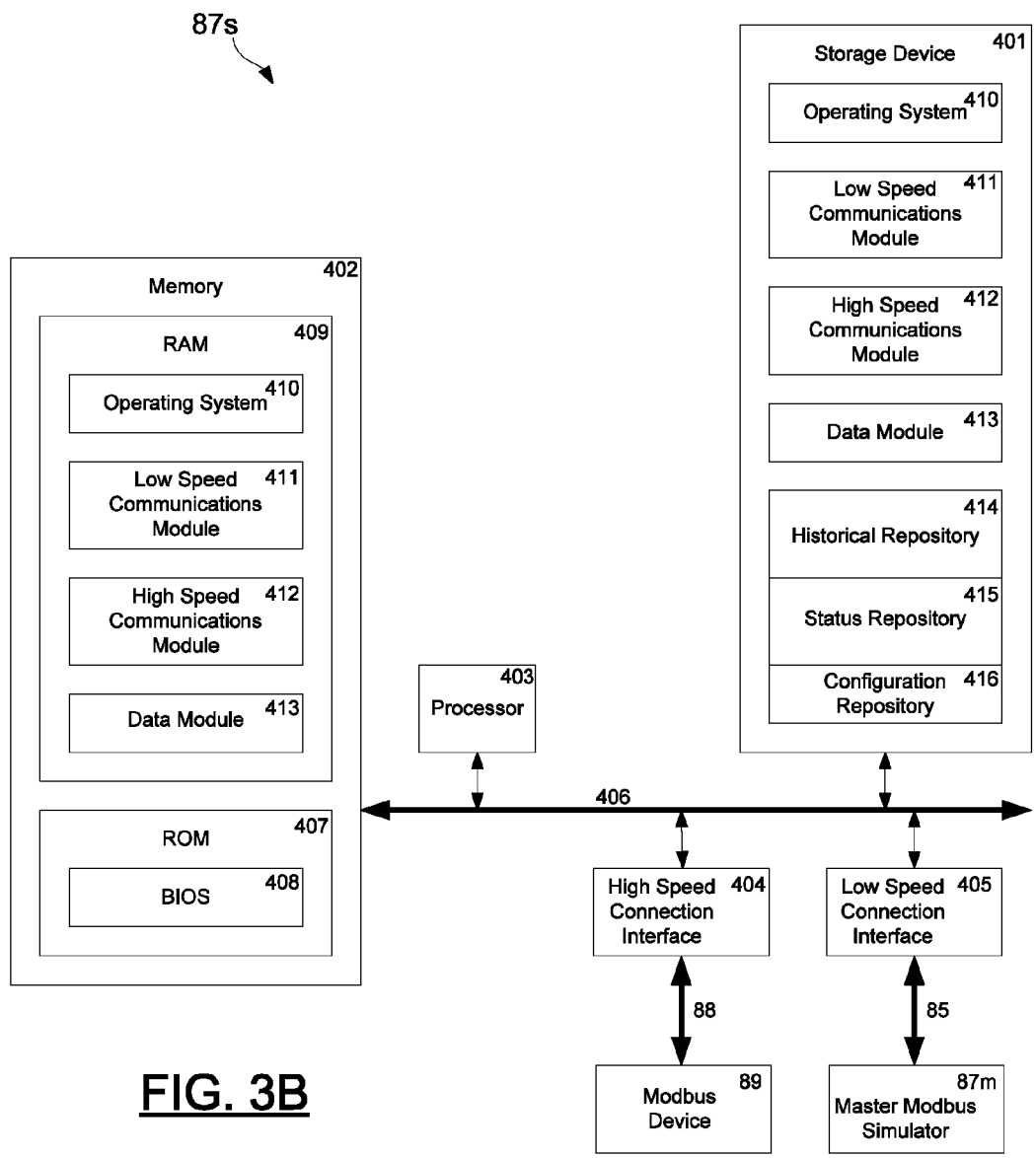
FIG. 3B is an embodiment of FIG. 3, depicting the Modbus simulator in a slave node.

Reference is now made to FIG. 3B, which provides a block diagram illustrating a Modbus simulator 87*s* as it may be present in the slave node 81. In addition to the components previously discussed regarding the Modbus simulator 87 of FIG. 3, the Modbus simulator 87*s*, as it may be present in the slave node 81, may connect to a Modbus device 89 via the high speed connection 88, which will be described in greater detail in the paragraphs that follow. Likewise, the Modbus simulator 87*s* of FIG. 3B, as it may be present in the slave node 81, may be connected to a Modbus simulator 87*m* in the master node 80, which will be discussed in greater detail in the paragraphs that follow.

Figure 4:
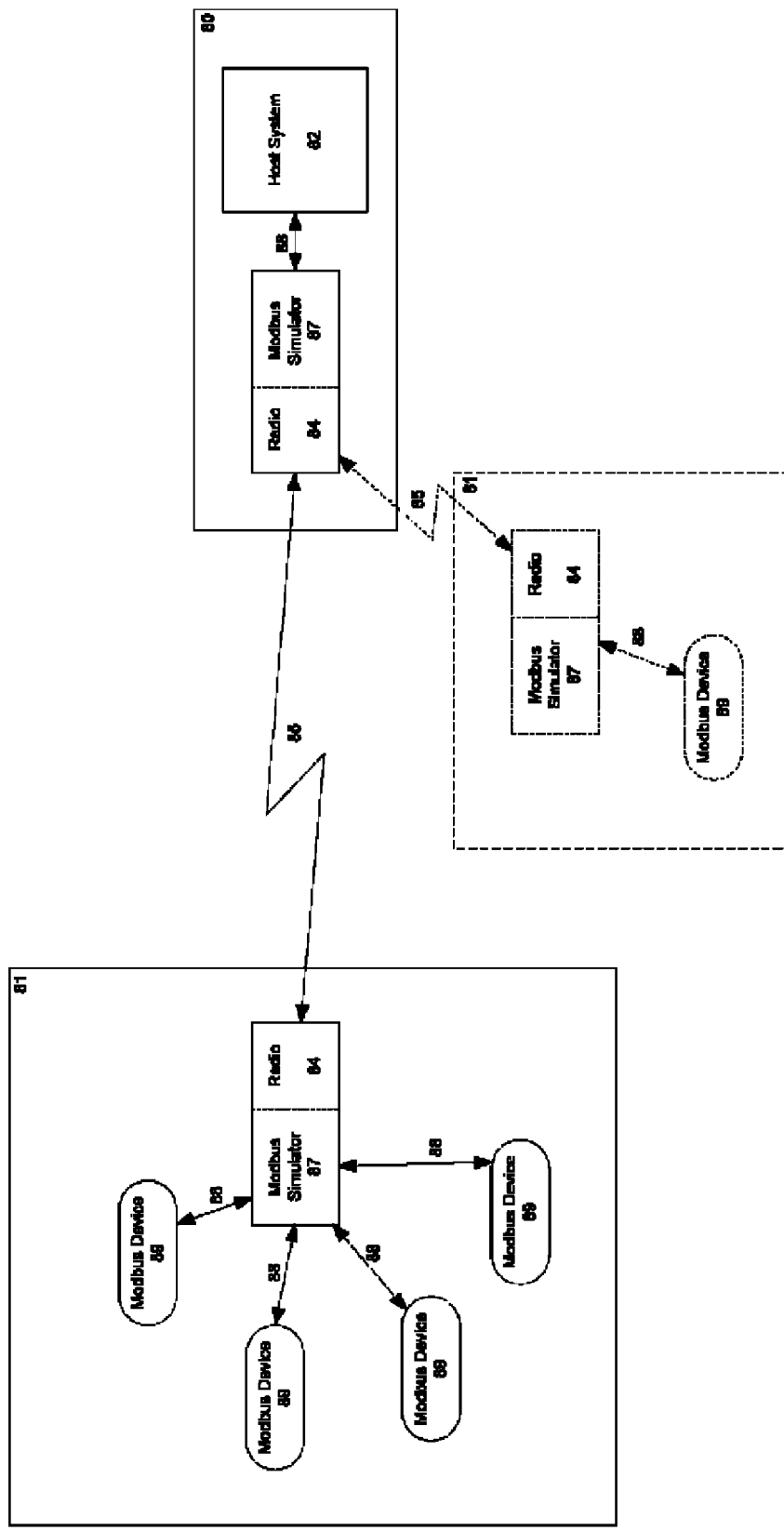
FIG. 4 is a block diagram of the connective structure of a Modbus simulator system network according to embodiments of the present invention.

Reference is now made to FIG. 4, which provides a block diagram illustrating an implementation of a Modbus simulator system 10, in accordance with an embodiment of the present invention. In this embodiment, the Modbus simulator system 10 may generally include two types of nodes—a master node 80 and a slave node 81, relative to the connective structure of a traditional Modbus configuration. The master node 80 may include the host system 82, which serves as the primary processing and data aggregation unit of the Modbus simulator system 10. The master node 80 may also include a Modbus simulator 87 and a radio 84. The radio 84 may provide a communication interchange for the connected host systems 82 and the components included in the slave nodes 81. A person of skill in the art will also appreciate that additional host systems 82 may be connected to a Modbus simulator 87, which may, for example, poll common and/or different registers of Modbus devices 89 present in the connected slave nodes 81 of the Modbus simulator system 10.

Use of Modbus simulators 87 in a network of host systems 82 and Modbus devices 89 may advantageously allow the efficient transmission of data between the host system 82 and the connected Modbus devices 89.

In embodiments described within this disclosure, the Modbus simulator 87, located in the master node 80 and the slave node 81, include substantially the same hardware configuration, regardless of which node it may be located in. For the sake of clarity, as illustrated in FIG. 3A, Modbus simulators 87 located in the master node 80 may be referred to as "master Modbus simulator 87*m*." Likewise, as illustrated in FIG. 3B, Modbus simulators 87 located in the slave node 81 may be referred to as "slave Modbus simulator 87*s*." A person of skill in the art will appreciate that this master/slave nomenclature may be applied to the registers included within a Modbus simulator 87, located within either the master node 80 or a slave node 81.

Referring back to FIG. 4, the host system 82 may connect to the master Modbus simulator 87*m*, using the Modbus protocol, via a high speed connection 88. The high speed connection 88 may be a link between multiple computing systems with the capability of sending and receiving data at a high transmission rate. Examples of a high speed connection 88 may include, but are not limited to, network or serial connections. A person of skill in the art, after having the benefit of this disclosure, will appreciate additional high speed connection protocols capable of sending and receiving data, consistent within the scope and spirit of the present invention as disclosed herein.

As the host system 82 may request register information from connected Modbus devices 89, as would be customary with a traditional Modbus communication system, the master Modbus simulator 87*m* may accept the communication requests and provide the requested register data to the host system 82 from the data stored within the master status repository 415 of the master Modbus simulator 87*m*. A person of skill in the art will appreciate that requested data may be stored in alternate addressable locations within the Modbus simulator 87, from which the register information may be provided to the host system 82 requesting data. In an embodiment of the present invention, the host system 82 may operate as the master device, and the master Modbus simulator 87*m* may operate as the slave device, as defined by the Modbus protocol.

At set intervals, the master Modbus simulator 87*m* may transmit a synchronization request to the slave Modbus simulator 87*s*, inquiring whether an event has occurred since the previous synchronization. The event may be defined as a change of register data within the status repository 415.

The Modbus simulator 87 may include a radio 84, through which the Modbus simulator 87 may communicate with the additional Modbus simulators 87 present in the Modbus simulator system 10 of the present invention. A skilled artisan will appreciate, after having the benefit of this disclosure, that additional transmitters and data connective structures may be used and remain within the scope and spirit of the present invention.

The first slave node 81 component to interface with the master node 80 may also be a Modbus simulator 87, which may communicate with the master Modbus simulator 87*m* via a transmission protocol known within the art. The transmission protocol may include the Modbus protocol. However, a person of skill in the art will appreciate that any protocol suitable to transmit data from one electronic device to another may be used to transmit data between two or more Modbus simulators 87, as the communication between Modbus simulators 87 is transparent to the host system 82 and Modbus devices 89 of the Modbus network.

The slave Modbus simulator 87s may connect to at least one Modbus device 89 via a high speed connection 88, using the Modbus protocol. This connection may be a link between multiple computing systems capable of sending and receiving data at a high transmission rate, such as, but not limited to, network or serial connections. In an embodiment of the present invention, the slave Modbus simulator 87s may operate as a master device, and the Modbus device 89 may operate as the slave device, as defined by the Modbus protocol.

In the slave node 81, the slave Modbus simulator 87s may operate as a virtual host system, wherein the slave Modbus simulator 87s may request register information from connected Modbus devices 89 using the Modbus protocol, as would be customary with a traditional Modbus communication system. The slave Modbus simulator 87s may store the register data provided by the Modbus devices 89 in the slave status repository 415. The slave Modbus simulator 87s may then transmit relevant register data to the master Modbus simulator 87m at set intervals via the radios 84 of the Modbus simulators 87, as requested by the master Modbus simulator 87m.

Figure 4A:
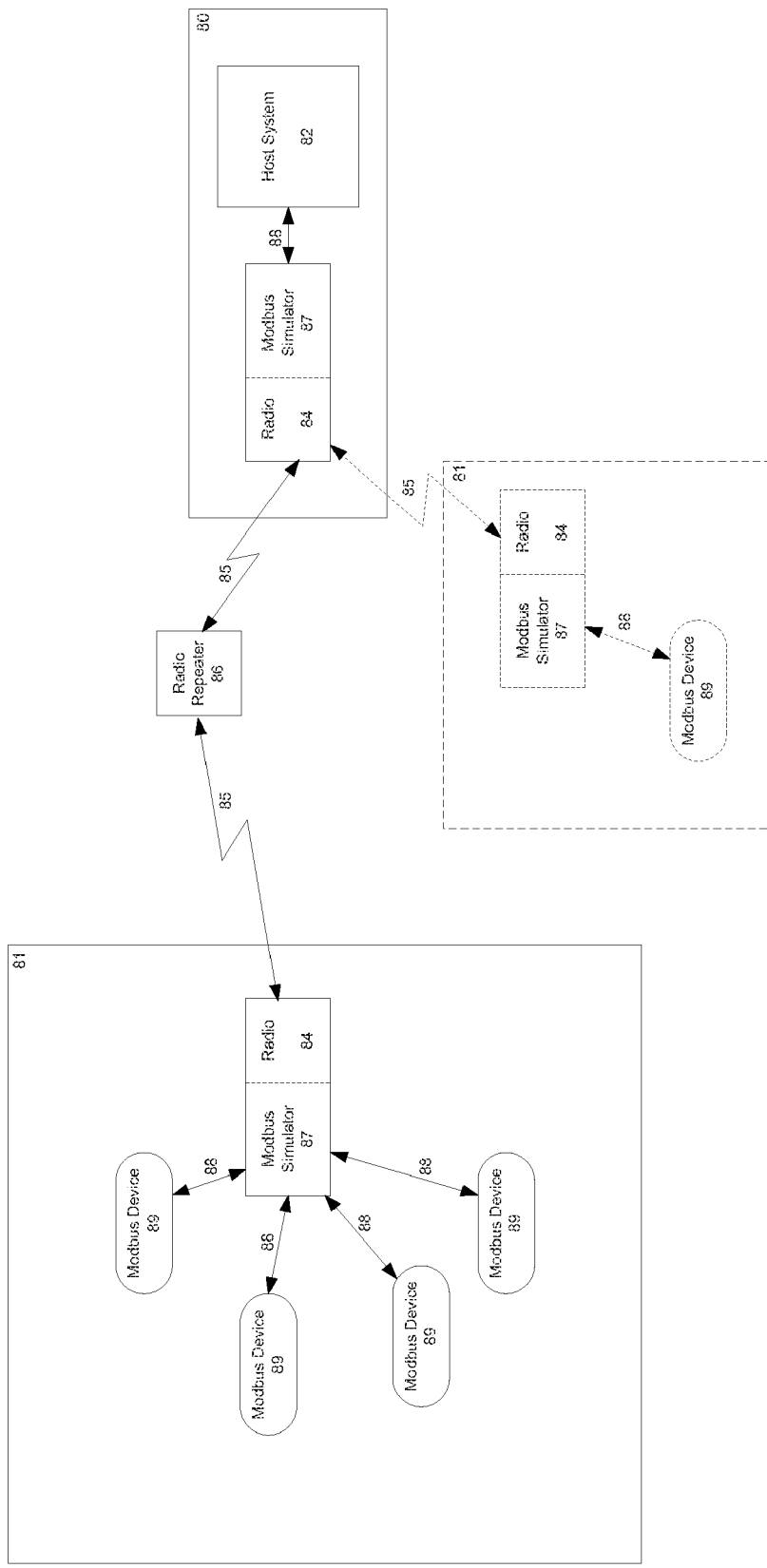
FIG. 4A is an alternate embodiment of FIG. 4.

As perhaps best illustrated in FIG. 4A, the data transmission broadcasted from the radio 84 of one Modbus simulator, which may be intended for reception by the radio 84 of another Modbus simulator, may be extended via a radio repeater 86. The radio repeater 86 may receive a signal that has been broadcasted by the radio 84 of a Modbus simulator 87. The signal received by the radio repeater 86 may be weak, due to attenuation and/or signal degradation as the radio signal may have been broadcasted over a distance. The radio repeater 86 may then amplify the data transmission signal in preparation to rebroadcast the signal. The radio repeater 86 may then retransmit the signal, which may be subsequently received by a Modbus simulator 87, located within the master node 80, the slave node 81 and/or another radio repeater 86. Those skilled in the art will also appreciate that communication between the slave node and the master node may be carried out using other communication techniques such as, for example, a wireless mesh network.

Figure 4B:
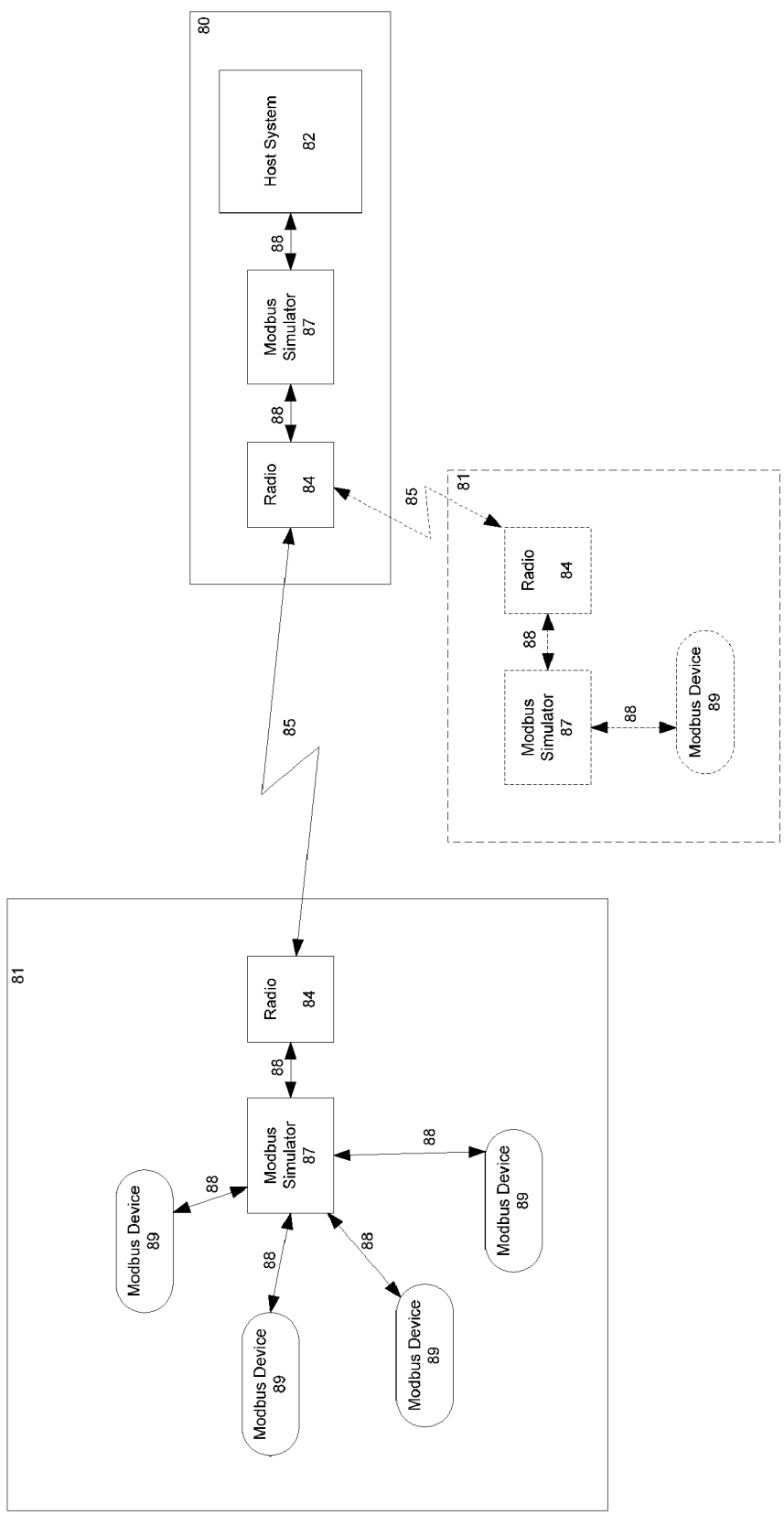
FIG. 4B is an alternate embodiment of FIG. 4.

As perhaps best illustrated in FIG. 4B, the radio 84 may be a separate device, which may be connected to the Modbus simulator 87 over a communication network. This communication network may preferably be a high speed network 88, but a skilled artisan will appreciate that any data communication network, which may not be required to operate on the Modbus protocol, may be used to transmit data between the Modbus simulator 87 and the radio 84.

Figure 5:
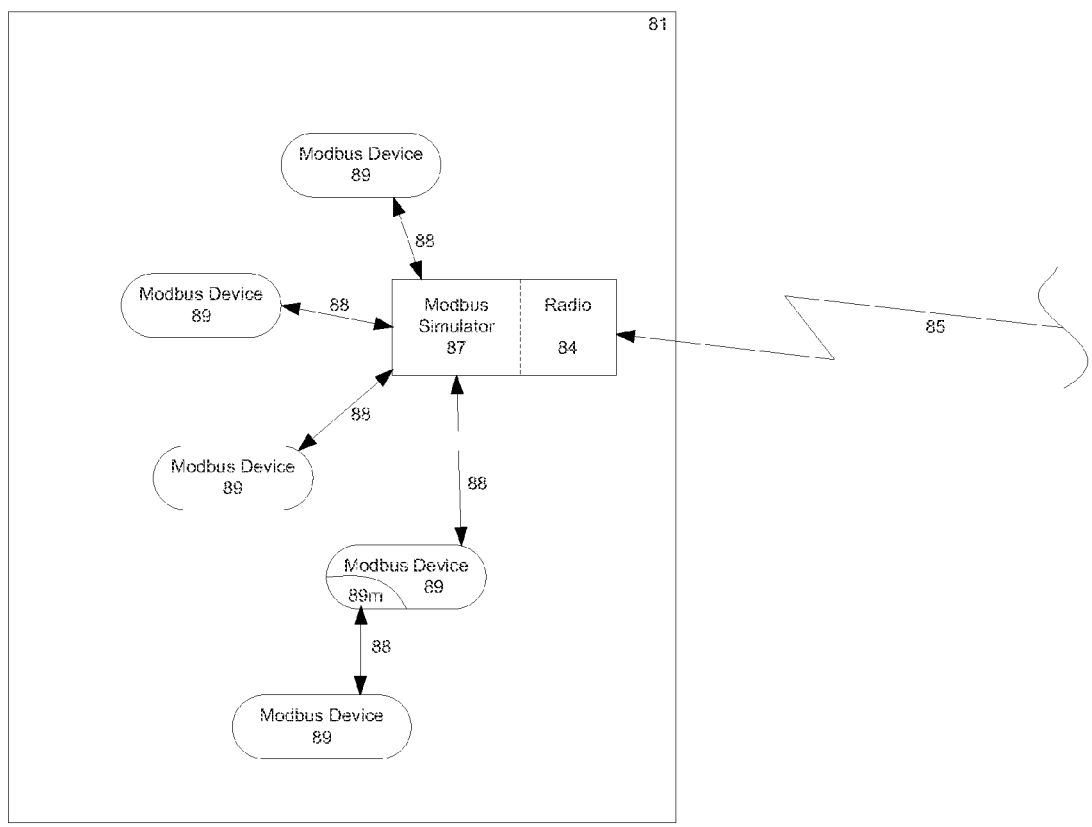
FIG. 5 is a block diagram of the slave node of FIG. 4, depicting an alternate embodiment thereof.

In an embodiment of the present invention, as illustrated in FIG. 5, the Modbus simulator 87 may connect to additional Modbus devices 89 via additional data connections using the Modbus protocol. In embodiments, these connections are preferably high speed connections 88, attached in either parallel or serial. In parallel connections, multiple Modbus devices 89 may share a direct connection to the Modbus simulator 87. In serial connections, multiple Modbus devices 89 may connect to another Modbus device 89 via a chain like structure. If multiple Modbus devices 89 are connected in serial, the first Modbus device 89 (directly connected to the Modbus simulator 87 as a slave device) may communicate with the slave Modbus simulator 87s (as the master device), as defined by the Modbus protocol. In a subsequent connection between the first Modbus device 89 and a second Modbus device 89, the first Modbus device 89 would communicate (as the master device) with the second Modbus device 89 (as the slave device). After the first Modbus device 89m receives the register data from the second Modbus device 89, the register data may be stored in register locations reserved for data that has been received as the master device in a Modbus communication. The first Modbus device 89m may then transfer the register data to register locations reserved for operation as a slave device in a Modbus communication. The register data in an intermediate Modbus device 89 may be polled by, and subsequently transmitted to, a master device. The master device may be, for example, the Modbus simulator 87, as is defined by the Modbus protocol.

Additional Modbus devices 89 may be attached to existing Modbus devices 89 in parallel or in serial. In subsequent serial connections, each $(n)^{th}$ Modbus device 89 may communicate with the Modbus simulator 87 by passing the data through the first, second, . . . , and $(n-1)^{th}$ serially connected Modbus device 89, as described above. Each Modbus device 89, whether connected in parallel or serial, may also be connected to additional Modbus devices 89 in parallel, relative to the connective structure between multiple Modbus devices 89 and the Modbus simulator 87, as described herein. In large slave nodes 81, numerous Modbus devices 89 may be connected in a branching structure, wherein the Modbus devices 89 located at the end of each branch may originate from and report to a central Modbus simulator 87.

Figure 5A:
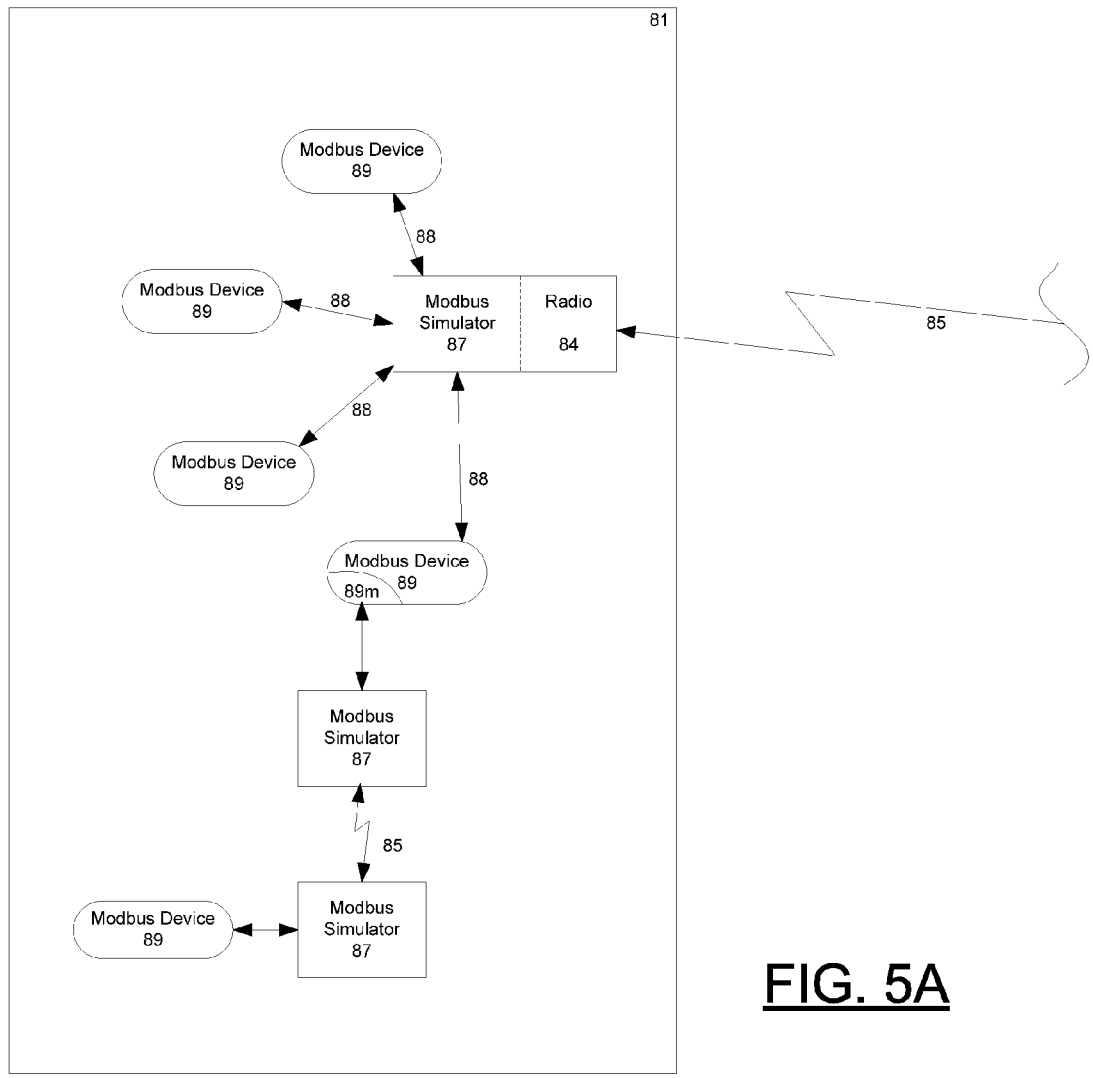
FIG. 5A is a block diagram of the slave node of FIG. 4, depicting an alternate embodiment thereof.

In an additional embodiment, as illustrated in FIG. 5A, additional Modbus simulators 87 may be located between serially connected Modbus devices 89, providing the same advantageous benefits as locating Modbus simulators between the host system 82 and connected Modbus devices 89. Since the presence and operation of Modbus simulators 87 are transparent to a Modbus network of connected devices, any number of Modbus simulators 87 may be utilized to provide efficient data transmission between two or more connected Modbus devices 89.

The master node 80 may communicate with the slave nodes 81 via a low speed connection 85, which may include traditional connection methods used in Modbus systems. Such low speed connections 85 may occur over transmission interfaces that are not optimized for throughput or speed. Examples of low speed connections 85 may include radio frequency, satellite, phone line or other similar twisted pair cable connection, or coaxial cable connection. However, such a low speed connection 85 is not required to transmit data via the Modbus protocol. A person of skill in the art will appreciate that, although the Modbus simulator system 10 is optimized to provide the largest benefit when providing efficient data transfer over low speed communication networks, the connection between Modbus simulators 87 may be of any connection known in the art, including high speed communication networks.

Although the disclosed embodiments of the present invention refer to using the Modbus standard for the simulated data transmission protocol between a host system 80 and connected Modbus devices 89, a skilled artisan will realize additional data transmission standards that are intended to be included within the scope of the present invention. Examples of other suitable standards, which are not intended to be limiting, may include DFS analog mode, DFS digital mode, DFS Qpoint mode, and open standards such as DMP-3.

In operation, the Modbus simulator according to the present invention advantageously allows for efficient data transfer by minimizing the volume of data required in each transmission. The Modbus simulator system 10 accomplishes the reduction of transmission data by only transmitting the changes in data, as recorded in the repositories of the Modbus simulator 87 at each slave node 81. Data transmission reduction is advantageously accomplished by eliminating the redundant transmission of unchanged data, thereby reducing the volume of data which must be transmitted. This reduction in redundant data transmission may free additional bandwidth that may be used to transmit additional relevant and important data to the master node 80, i.e., relieve congestion.

A plurality of Modbus simulators 87 may be connected in the communication path between the master device and the slave device of a traditional Modbus network. The Modbus simulators are functionally transparent during operation of the Modbus network, since both the host system 82 and the Modbus device 89 may function as if the devices were directly connected to one another.

During a polling operation in a traditional Modbus system, a master system would request the data contained within the asserted registers of a directly connected slave device. In response to the polling request, the slave device would simply return all of the data included within every requested register to the master system. As disclosed herein, the Modbus simulation system 10 may be imperceivably incorporated into an existing Modbus network, wherein the master device and slave devices cannot distinguish that each device is communicating with a Modbus simulator 87, and not the other device.

In the master node 80 of the Modbus simulator system 10, a host system 82 may similarly perform a polling operation to request register data from connected Modbus devices 89, as it would in a Modbus network absent any Modbus simulators 87. However, in the present invention, the polling operation may be accepted by the Modbus simulator 87. The Modbus simulator 87 may then respond to the polling request as if the Modbus simulator 87 were a directly connected Modbus device 89. Preferably, the host system 82 and Modbus simulator 87 may be connected via a high speed network 88, such that the transmission of the register data contained within the status repository of the Modbus simulator may occur with minimal delay.

The master Modbus simulator 87*m* may further communicate with another Modbus simulator, included in a slave node 81. A person of skill in the art will appreciate that any data communication protocol may be used for the communication between Modbus simulators 87, since the simulator-to-simulator communication is transparent to the Modbus network. In this communication between Modbus simulators 87, the master Modbus simulator 87*m* may utilize an array of data repositories to synchronize data with the slave Modbus simulator 87*s*. An illustrative Modbus synchronization operation has been provided below, as a non-limiting example.

Figure 6:
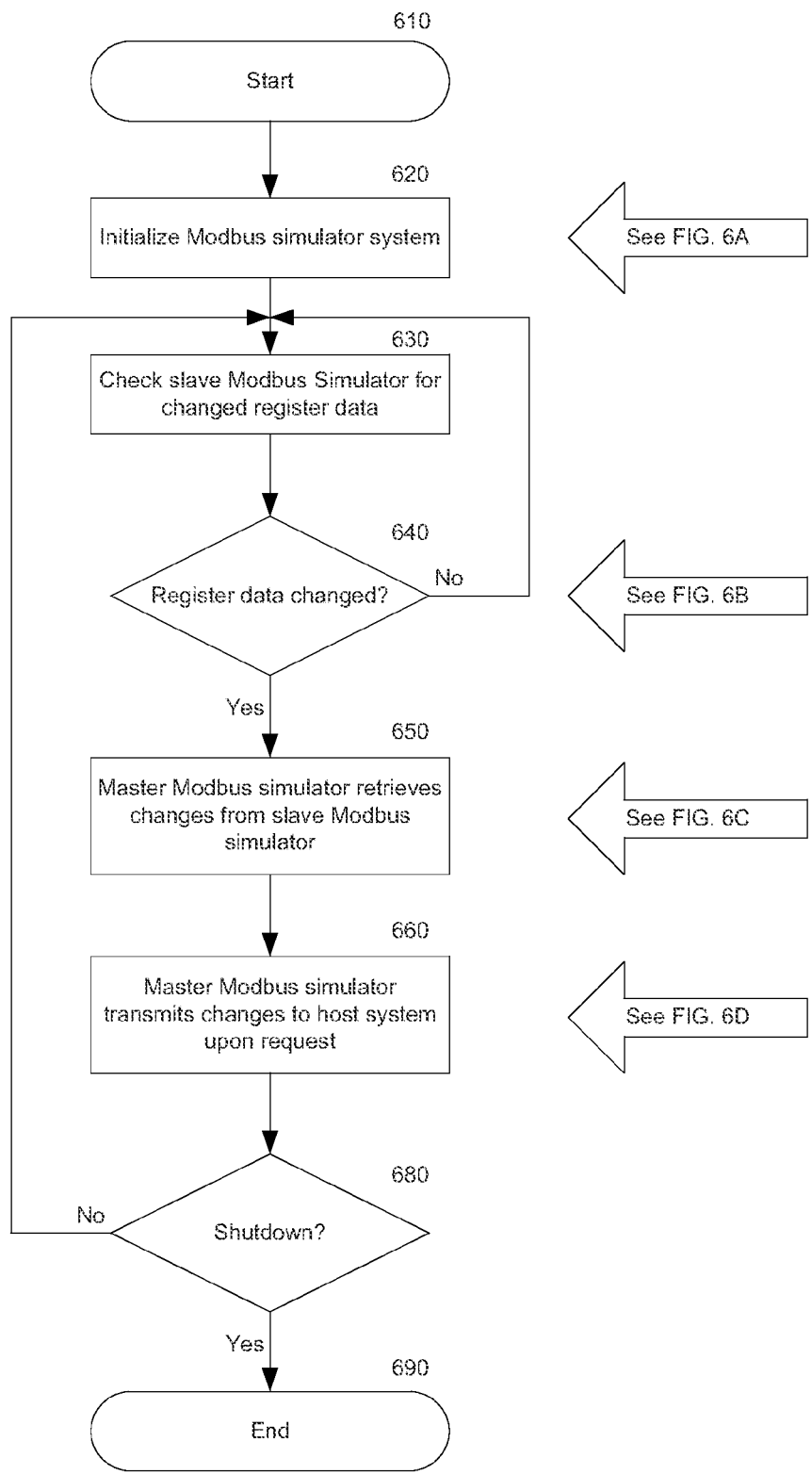
FIG. 6 is a flow chart illustrating a Modbus simulator system in operation, generally, in accordance with embodiments of the present invention.

Referring now to FIG. 6, a flow chart 600 describing a non-limiting example of the operation of a Modbus simulator system 10 according to embodiments of the present invention is now described. FIG. 6 presents the primary operations of the Modbus simulator system 10, with each operation being displayed in greater detail in the subsequent figures that follow.

From the start (Block 610), the Modbus simulator system 10 may perform an initialization operation (Block 620). Once properly initialized, the master Modbus simulator 87*m* may poll the slave Modbus simulator 87*s* to determine if there have been any changes to the register data contained therein (Block 630). At Block 640, it is determined whether or not there has been any change to the register data. If the slave Modbus simulator 87*s* reports that no changes have occurred to the register data at Block 640, the system may return to the operation described in Block 630. Additional details regarding initializing the Modbus simulator system according to the present invention are described below and illustrated in FIG. 6A.

If, however, it is determined at Block 640 that there have been changes in the register data, i.e., the slave Modbus simulator 87*s* returns an event, or data that indicates changes to the register data, then the master Modbus simulator 87*m* may retrieve the changed register from the slave Modbus simulator 87*s* (Block 650). In this operation, the master Modbus simulator 87*m* may synchronize its status repository 415 to reflect any changes that have occurred in the status repositories 415 of any connected slave Modbus simulators 87*s*. Additional details regarding determining whether or not there has been a change in the register data is discussed below and illustrated in FIG. 6B, and additional details regarding retrieving the changes from the slave Modbus simulator are discussed below and illustrated in FIG. 6C.

Once the master Modbus simulator 87*m* has updated its status repository 415 with the most current register data, it may wait to be polled by the host system 82 for the current values in its specified registers. Upon a polling request by the host system 82, the master Modbus simulator 87*m* may transmit the requested register data stored in its status repository 415 to the host system 82 (Block 660). Additional details of transmitting the changes to the host system are described below and illustrated in FIG. 6D.

At Block 680, it may be determined whether or not a shutdown command has been issued. If it is determined at Block 680 that a shutdown command has been detected, the operation may terminate at Block 690. If, however, no shutdown command is detected at Block 680, then the system may return to the operation described in Block 630, wherein the master Modbus simulator 87*m* may continue to poll the slave Modbus simulators 87*s* for changes in register data.

Figure 6A:
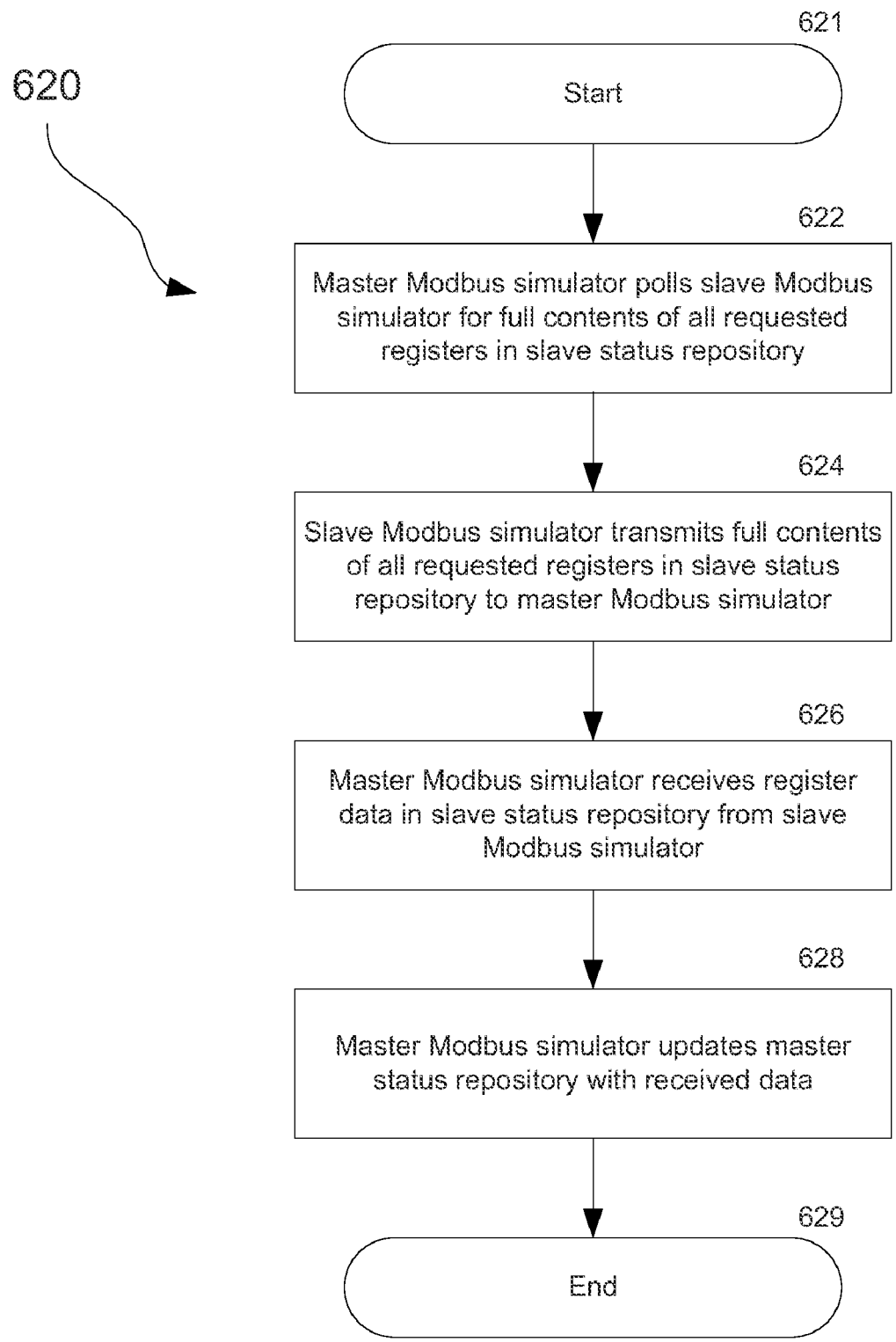
FIG. 6A is a flow chart illustrating the initialization operation of the Modbus simulator system, in accordance with embodiments of the present invention.
Figure 6B:
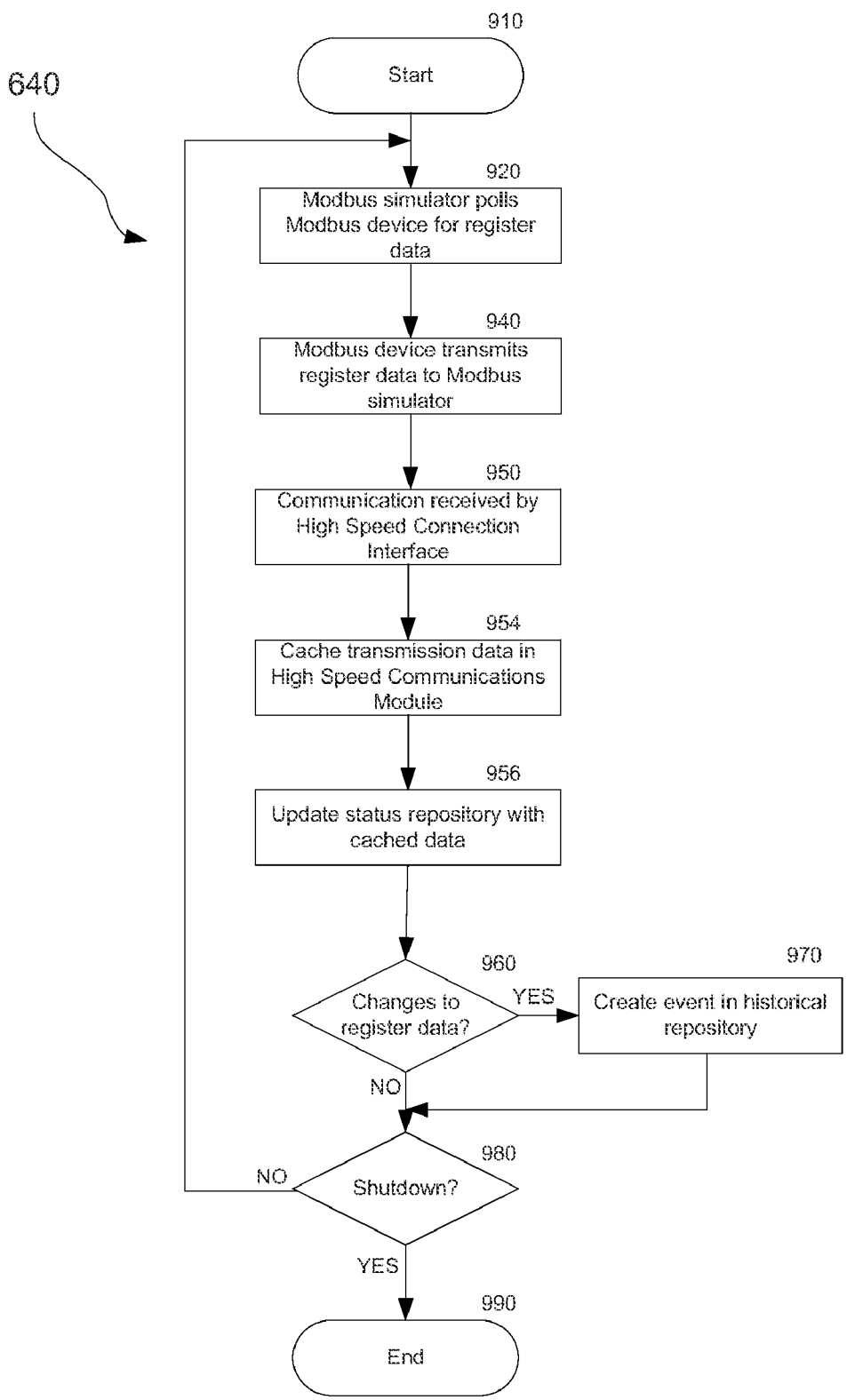
FIG. 6B is a flow chart illustrating the communication between the Modbus simulator and a Modbus device, in accordance with embodiments of the present invention.

Referring now additionally to the flow chart 620 illustrated in FIG. 6A, the initialization operation described in Block 620 of flow chart 600 (FIG. 6) is now described in greater detail. Use of the Modbus simulator system 10 according to the present invention begins with initialization of the Modbus simulators 87. From the start (Block 621), the master Modbus simulator 87*m* may poll the slave Modbus simulator 87*s* to return the full contents of any requested registers (Block 622). Upon receiving this request, the slave Modbus simulator 87*s* may transmit the register values, stored in its status repository 415, for every register requested by the master Modbus simulator 87*m* (Block 624). In other words, the slave Modbus simulator may transmit the full contents so of all the requested registers in the slave status repository to the master Modbus simulator. The slave Modbus simulator 87*s* may have received the aforementioned register values from connected Modbus devices 89, as described in more detail below.

After the slave Modbus simulator 87*s* transmits the requested register data to the master Modbus simulator 87*m*, the master Modbus simulator 87*m* may store the transmitted data in its status repository 415 (Block 626). In other words, the master Modbus simulator receives the register data in the slave repository from the slave Modbus simulator. Once stored in the status repository, the master Modbus simulator 87*m* may communicate the data to the host system in response to a subsequent request for the aforementioned register data values (Block 628). Thereafter, the initialization operation is terminated (Block 629).

Operating in the slave node 81, the Modbus devices 89 may detect and record various sensory data into its registers at set intervals. Referring now to the flow chart 640 illustrated in FIG. 6B request and acquisition of data between the slave Modbus simulator 87*s* and a Modbus device 89, in accordance with embodiments of the present invention is now described in greater detail. The illustrative operation may begin at Block 910. The slave Modbus simulator 87*s*, which may virtually appear to the connected Modbus devices 89 as a host system 82, may poll the Modbus devices 89 for the register data contained therein (Block 920). Upon a polling request from the slave Modbus simulator 87s, the Modbus devices 89 may then transmit the register data contained therein to the slave Modbus simulator 87s for the requested registers (Block 940). This data transmission between the Modbus devices 89 and slave Modbus simulator 87s may preferably use the Modbus protocol via the high speed connection 88. The slave Modbus simulator 87s may then receive the register data from the Modbus device.

The reception of the register data by the slave Modbus simulator 87s, as represented by Blocks 950, 954, 956, will now be discussed in greater detail. The communication between the Modbus device 89 and the slave Modbus simulator 87s may be received by the high speed connection interface 404 of the Modbus simulator 87 (Block 950). Once received, the data communication may be cached in the high speed communications module 412, included within the storage device 401 and/or memory 402 (Block 954). The slave Modbus simulator 87s may then update its status repository 415, included within the storage device 401 of the slave Modbus simulator 87s (Block 956). A person of skill in the art, after having the benefit of this disclosure, will appreciate memory organization techniques in addition to a dedicated memory module, used to store the data received over the high speed connection 88.

The slave Modbus simulator 87s may then compare the register data received by the Modbus devices 89 with the data values previously stored within the slave status repository 415. Accordingly, it is determined at Block 960 whether or not there have been any changes to the register data. If it is determined at Block 960 that a change has occurred, then an event is created in the slave historical repository at Block 970. If it is determined at Block 960 that no changes have occurred, or, alternatively, if after the event has been created in the historical repository at Block 970, it is determined at Block 980 whether a shutdown command has been issued. If a shutdown command has been issued, the slave Modbus simulator 87s may shutdown, terminating its operation at Block 990. If, however, no shutdown command has been issued at Block 980, the slave Modbus simulator 87s may return to the operation of Block 920, wherein it may again poll the connected Modbus devices 89 for a transmission of the register data contained therein.

In the initialization operation, and in subsequent polling operations, the master Modbus simulator 87m may request the register data for selected registers, which may have been requested by the host system 82 connected to the master Modbus simulator 87m. By only requesting the transmission of register data that has been requested by the host system 82, the Modbus simulator system 10 may require the monitoring and synchronization of less than all of the registers permitted by the Modbus protocol. This selectivity of transmitted registers may allow the Modbus simulator system 10 to further reduce the data required to be transmitted over the low speed network 85, advantageously increasing the efficiency of the Modbus network.

Figure 6C:
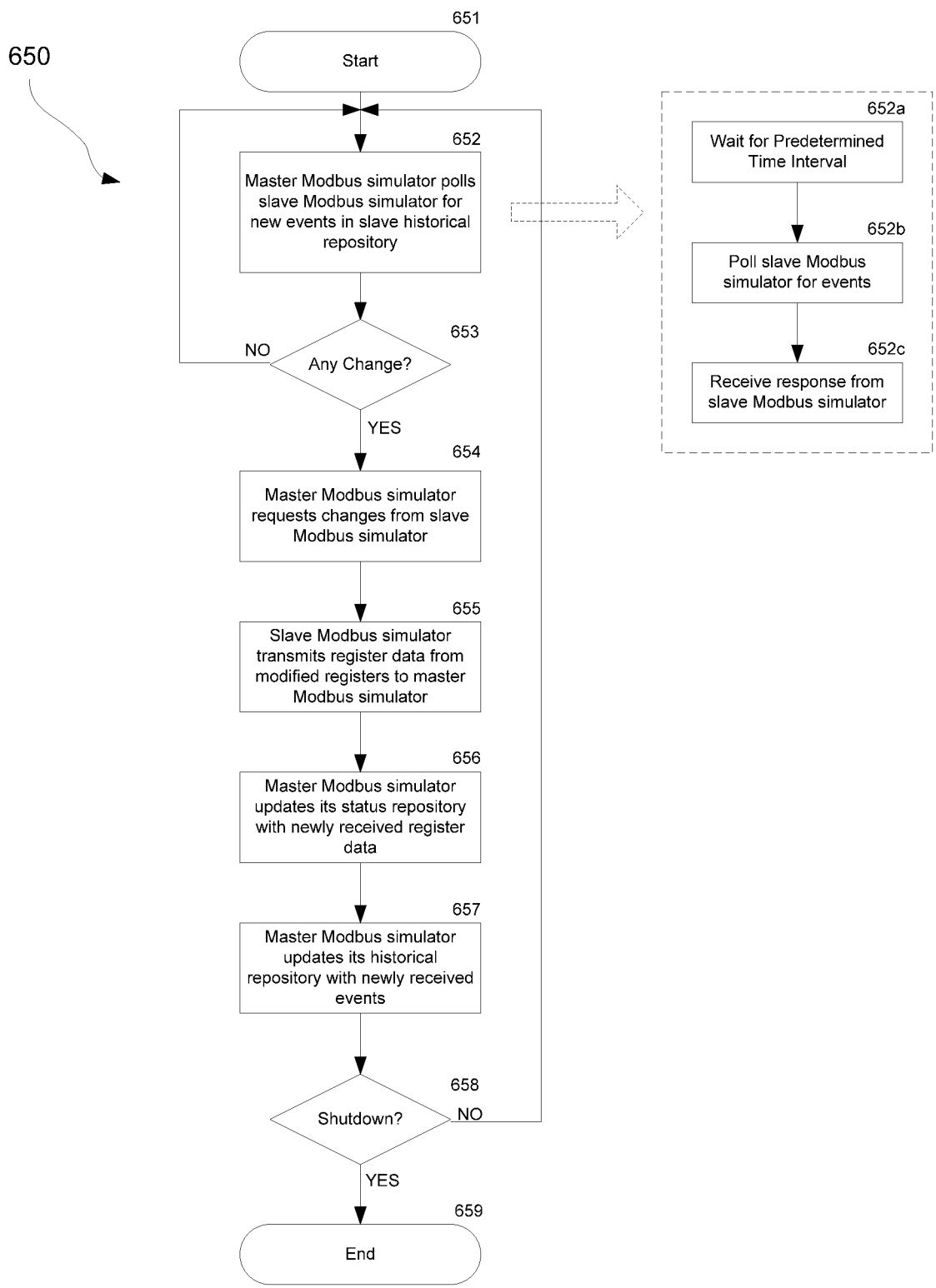
FIG. 6C is a flow chart illustrating the Modbus simulator synchronization operation in accordance with embodiments of the present invention.
Figure 6D:
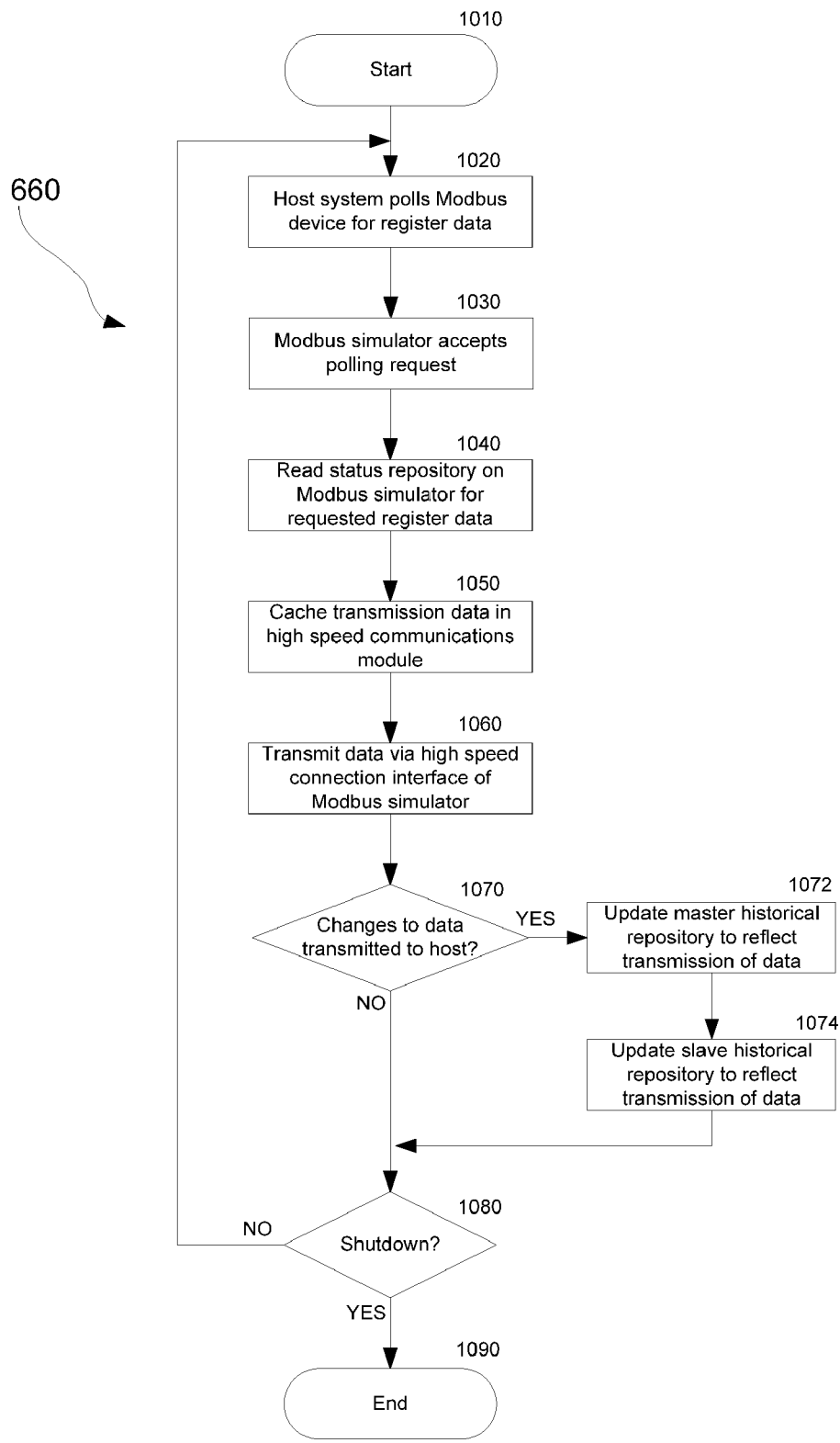
FIG. 6D is a flow chart illustrating the communication between the Modbus simulator and a host system, in accordance with embodiments of the present invention.

Referring now to the flow chart 650 illustrated in FIG. 6C, a non-limiting example for a synchronization operation between a master Modbus simulator 87m and a slave Modbus simulator 87s, in accordance with embodiments of the present invention is now described in greater detail. The flow chart 650 corresponds with Block 650 of FIG. 6. The process may begin at Block 651. After initializing the master status repository 415, the master Modbus simulator 415 may poll the slave Modbus simulator 87s to determine if any new events have occurred since the last polling operation (Block 652).

As previously discussed, a Modbus simulator 87 may include a historical repository 414 and a status repository 415. The status repository 415 may include all the register data that would typically be transmitted in a traditional Modbus network. This register data may include data reported from a Modbus device 89 or data reported to a host system 82. The historical repository 414 may store events, which signify changes made in the status repository 415. As an example, we will consider an instance wherein one register within the status repository 415 were to hold a data value of "00AF" prior to the polling of a connected Modbus device 89. If, after polling the Modbus device 89, a new data value of "00AE" is returned to the Modbus simulator 87, the Modbus simulator may update and replace the old "00AF" data value with the new "00AE" data value. After making the replacement, the Modbus simulator 87 may create an event in the historical repository 414, signifying that a replacement of register data has occurred in the status repository 415. The inclusion of events in the historical repository 414 advantageously allows the Modbus simulators 87 to synchronize by polling for events in the historical repository, as opposed to analyzing the entire contents of the status repository 415.

Due to the low transmission speeds of the low speed connection 85, the operation illustrated in flowchart 650 may include a delay subroutine. A person having skill in the art, after having the benefit of this disclosure, would recognize that the slave status repository 415 may change at some predictable frequency, or at least never more frequently than a predetermined particular time period (e.g., 100 times per day, 30 times per second, etc.), depending on the type and number of Modbus devices 89 connected in the slave node 81. Accordingly, it would be impractical to poll the slave historical repository 414 more frequently than the rate at which an event is likely to occur. By waiting for a predetermined period of time before requesting status updates, the frequency of data requests to the slave node 81 may be advantageously set to avoid transmitting and comparing information that is likely to be redundant.

As a result, the operation of Block 652 may be broken down into subroutines, as illustrated, for example, in the Blocks to the right of Block 652. More specifically, initially, the master Modbus simulator 87m may be programmed to wait for a predetermined time interval (Block 652a). Preferably, the predetermined time interval should be equal to or less than the time it may take a slave Modbus simulator 87s to update its status. However, a skilled artisan, after having the benefit of this disclosure, will appreciate that the predetermined time interval may be of any length. Once the predetermined time interval has lapsed, the master Modbus simulator 87m may poll the slave Modbus simulator 87s for events in the historical repository by sending a request to the slave Modbus simulator (Block 652b). The master Modbus simulator 87m may then receive a response from the slave Modbus simulator 87s containing the requested data (Block 652c).

Once the slave historical repository 414 has been analyzed, the Modbus simulator system 10 may determine whether there have been any changes in the status repository 415, i.e., whether or not any events have occurred (Block 653). If no events have occurred, the system may return to the operation described in Block 652 and again poll the slave Modbus simulator 87s for new events in the slave historical repository 414. If, however, it is determined at Block 653 that the slave Modbus simulator 87s includes an event present in its historical repository 414, signifying that a change of register data has occurred in the slave status repository 415, the master Modbus simulator 87*m* may request the changed register data to update its master status repository 415 (Block 654). The slave Modbus simulator 87*s* may then transmit the changed register data to the master Modbus simulator 87*m* (Block 655). After receiving and recording the changed register data from the status repository 415 of the slave Modbus simulator 87*s*, the master Modbus simulator 87*m* may update its master status repository 415 with the newly received register data (Block 656). By transmitting only the changes in the slave status repository 415 to the master Modbus simulator 87*m*, over the low speed connection 85, the Modbus simulator system 10 may advantageously decrease the volume of data that must be transmitted. By reducing the volume of the data transmission for each slave node 81 over the low speed connection 85, i.e., by decreasing congestion, additional slave nodes 81 may be able to transmit data over the low speed connection 85 by utilizing the additional bandwidth preserved by the Modbus simulator system 10 as described herein. The master Modbus simulator 87*m* may next create, or update, events within its historical repository 414 with the newly received events at Block 657. This can be accomplished by creating or updating an entry in the master historical repository 414 to reflect the event wherein the change in status repository 415 occurred.

Once the master status repository 415 and master historical repository 414 have been updated, the Modbus simulation system 10 may next determine whether a shutdown command has been received (Block 658). If a shutdown command has been received, the program may terminate at Block 659. If, however, no shutdown command has been received, the program may return to Block 652, wherein it may again poll the slave Modbus simulator 87*s* for new events that may be included in the slave historical repository 414.

Operating in the master node 80, the host system 82 may request various sensory data entries included in the registers of the connected Modbus devices 89. Referring now additionally to the flow chart 660 illustrated in FIG. 60, the request and acquisition of data between the host system 82 and the master Modbus simulator 87*m*, in accordance with embodiments of the present invention is now described in greater detail. The flow chart 660 corresponds with Block 660 of FIG. 6.

The illustrative operation may begin at Block 1010. The host system 82 may poll to the Modbus devices 89 to report the register data contained therein (Block 1020). The master Modbus simulator 87*m* may accept the polling request (Block 1030) intended for the Modbus device 89. In the Modbus simulator system 10, of the present invention, the master Modbus simulator 87*m* may virtually appear as a connected Modbus device 89 to the host system 82.

The transmission of register data from the master Modbus simulator 87*m* to the host system 82 will now be discussed in greater detail. Upon receiving a polling request from the host system 82, the master Modbus simulator 87*m* may read its status repository 415, included within the storage device 401 of the master Modbus simulator 87*m*, for the requested register data (Block 1040). Once the register containing the requested data has been addressed, the master Modbus simulator 87 may cache the transmission data in the high speed communications module 412, included within the storage device 401 and/or memory 402 of the master Modbus simulator 87*m* (Block 1050). The master Modbus simulator 87*m* may then transmit the requested register data to the host system 82 through its high speed connection interface 404 (Block 1060). This data transmission between the host system 82 and master Modbus simulator 87*m* may preferably use the Modbus protocol, as in traditional Modbus networks, via the high speed connection 88. A person of skill in the art, after having the benefit of this disclosure, will appreciate memory organization techniques, in addition to a dedicated memory module, that may be used to store the data received over the high speed connection 88.

The master Modbus simulator 87*m* may determine if there have been changes to the data that was transmitted to the host system 82 since the previous data transmission to the host system (Block 1070). If it is determined that no changes have been transmitted, it may next be determined whether a shutdown command has been issued (Block 1080). Alternately, if it is determined at Block 1070 that a change in at least one register of the master status repository 415 has been transmitted to the host system 82, the master Modbus simulator 87*m* may update its historical repository 414 to reflect the transmission of the changed register data to the host system 82 (Block 1072). The master Modbus simulator 87*m* may also update the slave historical repository 414 to reflect the transmission of the data (Block 1074). This may be accomplished by sending a synchronization transmission to the connected slave Modbus simulator 87*s*, reporting that the changed register has been received by the host system 82 of the master node 80. Receipt of this synchronization transmission by the slave Modbus simulator 87*s* may result in the slave Modbus simulator 87*s* updating its slave historical repository 414 to reflect the transmission of the related event to the host system 82.

After the event has been created, the master Modbus simulator 87*m* may determine whether a shutdown command has been issued (Block 1080). If it is determined at Block 1080 that a shutdown command has been issued, the master Modbus simulator 87*m* may shutdown, terminating its operation at Block 1090. If no shutdown command has been issued at Block 1080, the master Modbus simulator 87*m* may return to the operation of Block 1020, wherein the host system 82 may again poll the master Modbus simulator 87*m* for an updated transmission of the register data contained therein.

In the initialization operation, and in subsequent polling operations, the host system 82 may request the register data for selected registers, which may be communicated to the slave Modbus simulator 87*s*. By transmitting only register data that has been requested by the host system 82 between the Modbus simulators 87, the Modbus simulator system 10 may advantageously require the monitoring and synchronization of less than all the registers permitted by the Modbus protocol. This selectivity of transmitted registers may allow the Modbus simulator system 10 to further reduce the data required to be transmitted over the low speed network 85, advantageously increasing the efficiency of the Modbus network.

A slave Modbus simulator 87*s* may communicate with components in the master node 80 over a low speed connection interface 405. As a non-limiting example, the low speed communication may occur over a radio or satellite connection. A skilled artisan will realize, however, that additional communication protocols may be used to transmit data across a network. A skilled artisan will also appreciate that the low speed connection interface 405 may alternately utilize a high speed connection network, or any network structure in which data may be transmitted from one electronic device to another electronic device, and remain within the scope and spirit of the present invention.

The slave Modbus simulator 87*s* may collect and store register data that may be transmitted to the master node 80. More specifically, the slave Modbus simulator 87*s* may transmit data to the master Modbus simulator 87*m* over the low speed connection 85. The master Modbus simulator 87*m* may temporarily store the data to be communicated to the host system 82 in its high speed communications module 412, located in the storage device 401 of the Modbus simulator 87. The master Modbus simulator 87m may then transmit the register data to the host system 82, using the Modbus protocol, via its high speed connection interface 404.

The node data module 413 of a Modbus simulator may, among other things, contain configuration instructions, used so that the node processor 403 may read and write the values of register tables. These register values may be associated with one or more Modbus devices 89, which may be written to and from a historical data repository 414 and a status repository 415, residing in a node storage device 401. The historical repository 414 of the Modbus simulator 87 may include events for changes that have occurred to the data included within the status repository 415 since the last polling of a connected Modbus device 89 (e.g. timestamp, type of event, and register location information), which may include physical devices connected in the slave node or Modbus simulators 87, acting as virtual Modbus devices, connected in the master node 80. In the slave node 81, the slave status repository 415 may include the data values as reported by the connected Modbus devices 89 over the high speed network. In the master node, the master status repository 415 may include data, synchronized with the Modbus simulator 87 of the slave node 81, which data may then be reported to the host system 82 upon a polling request by the host system 82.

When a data value changes in the status repository 415 of a slave Modbus simulator 87s, an event of that change may be recorded in its historical repository 414. The node data module 413 may also instruct the node processor 403 to write data to and from the historical data repository 414 after receiving register values from the high speed communications module 412. Similarly, the node data module 413 may be able to instruct the node processor 403 to provide requested data through the low speed communications module 412 by retrieving register values from the historical data repository 414.

Figure 7:
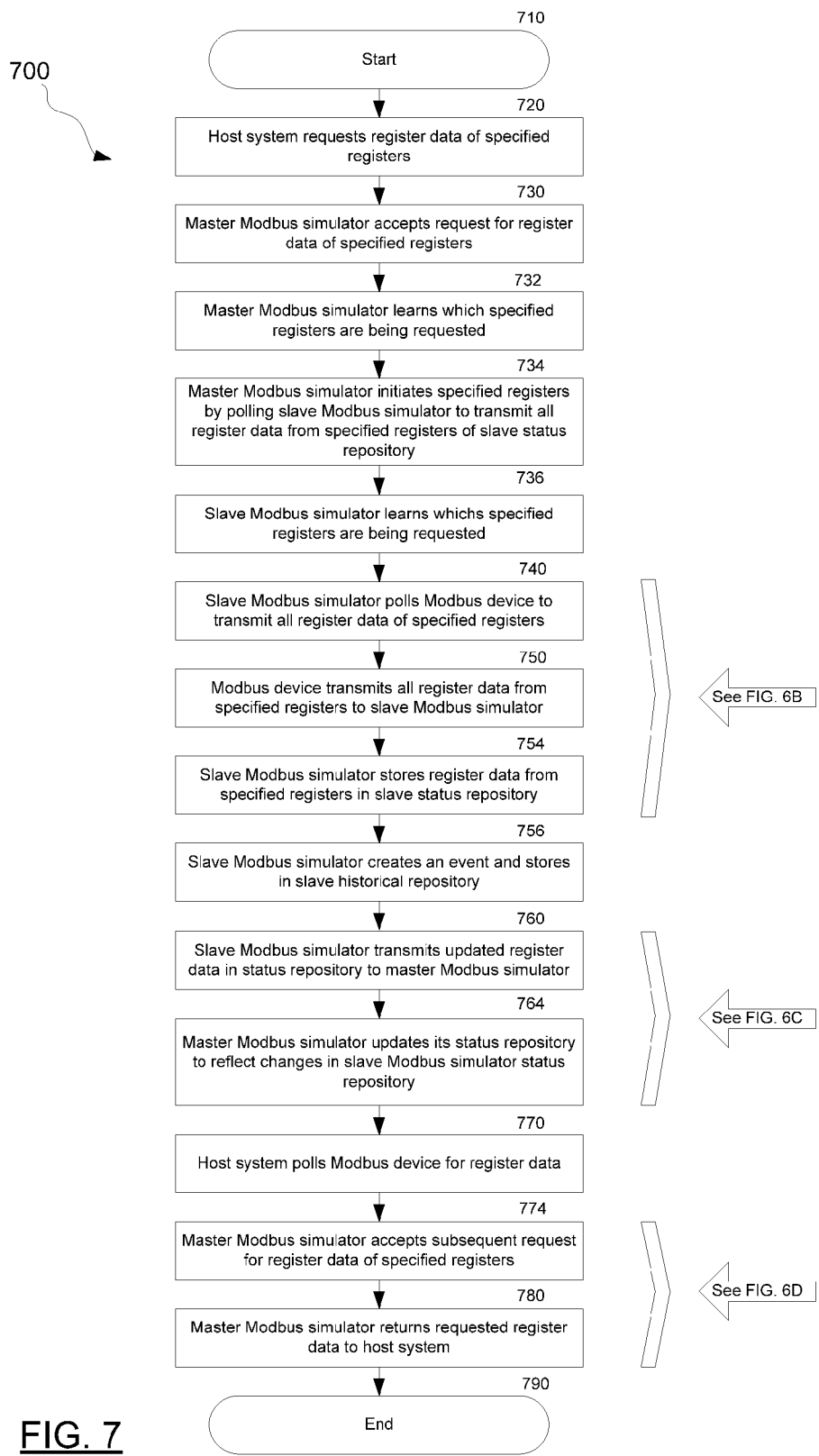
FIG. 7 is a flow chart illustrating the transmission path of data, in accordance with embodiments of the present invention.

Referring now additionally to the flow chart 700 illustrated in FIG. 7, the succession of operations that occur between the host system 82 polling for updated register data by the host system 82 and the receipt of updated register data by the host system 82, according to embodiments of the present invention are now described in greater detail. A person of skill in the art will appreciate that alternate or additional devices and operations may be included in the operation of requesting and receiving updated register data values. As a result, a skilled artisan will appreciated that the following example is intended to present an illustrative embodiment that demonstrates the aforementioned operation, and that additional operational steps are intended to be included within the scope of the present invention.

From the start (Block 710), the data request begins with the host system 82 requesting register data of specific registers from a connected Modbus device 89, which is typical to a system that would use the Modbus protocol (Block 720). The master Modbus simulator 87m may accept the request for register data for the specified registers from the host system 82 at Block 730. In the an embodiment of the present invention, the master Modbus simulator 87m may approximately immediately return the present state of the requested register values, as they exist in the status repository 415 of the master Modbus simulator 87m, to the host system 82. During the first response to a register request, made during the initialization phase, the return of register values by the master Modbus simulator 87m may include zero values, since the master Modbus simulator 87m may not have had an opportunity to perform its initial synchronization with the slave Modbus simulators 87s. This hasty return of register values, whether containing zero data or actual data, may advantageously prevent the host system 82 from detecting a time-out, which may cause the host system to assume that a Modbus device 89 has failed. In an alternate embodiment, the master Modbus simulator 87m may not return any register values to the requesting host system 82 until it has had the opportunity to synchronize its registers with the connected slave Modbus simulators 87s. A person of skill in the art will appreciate, after having the benefit of the disclosure, that both of the aforementioned initial return operations, along with numerous additional operational procedures for returning register data during the initialization stages, are intended to be included as additional embodiments of the invention disclosed herein.

Once the master Modbus simulator 87m has received a request for register data for a specified register or plurality of registers, the master Modbus simulator 87m may learn which specified registers have been requested (Block 732). In one embodiment, once the master Modbus simulator 87m has learned a register, it may include the learned register in every subsequent polling operation to the slave node 81 for changes in register data. A person of skill in the art will appreciate additional polling procedures for requested registers, which may include, but should not be limited to, continuing to poll for changes in the selected register for a specified quantity of polls, for a specified duration of time, until a maximum number of registers are being polled, or other register remembering procedures that would be apparent to a person of skill in the art.

For simplicity, the present illustrative embodiment will only describe the polling of a single register. A skilled artisan will appreciate that numerous registers may be polled by the Modbus simulator system 10 of the present invention. The master Modbus simulator 87m may initiate specified registers by polling the slave Modbus simulator 87s to transmit all register data from the specified registers of the slave status repository 415 (Block 734). Thereafter, the slave Modbus simulator 87s may also learn, or remember, which specified registers are being requested so that the slave Modbus simulator may monitor the requested register in subsequent polling requests to the connected Modbus devices 89 (Block 736).

The slave Modbus simulator 87s may poll the appropriate Modbus device 89 to transmit all register data of the specified registers (Block 740). In response to the polling request, the Modbus device 89 may transmit all the register data from the specified registers to the slave Modbus simulator 87s (Block 750). The data transfer between a Modbus device 89 and a slave Modbus simulator has been discussed in greater detail above and is perhaps best illustrated in FIG. 6B. Also, the Modbus device 89 is unable to distinguish whether the polling request has come from a host system 82 or a Modbus simulator 87. As a result, the Modbus device may return the requested register data in a manner substantially identical to a traditional Modbus network Upon receiving the data from the Modbus device 89, the slave Modbus simulator 87s may store the register data in its status repository 415 (Block 754). The slave Modbus simulator 87s may also create an event, indicating that the new data has been recorded in its status repository 415. This event may be stored in the slave Modbus simulator 87s historical repository 414 (Block 756). The slave Modbus simulator 87s may then wait to be polled by the master Modbus simulator 87m, wherein the master Modbus simulator 87m may inquire as to whether any events (changes to the status repository 415) have occurred.

Once a poll for events has been received by the slave Modbus simulator 87s, the slave Modbus simulator 87s may alert the master Modbus simulator 87*m* that a new event has occurred since the last polling. Thereafter, the slave Modbus simulator 87*s* may transmit the updated register data in the status repository 415 to the master Modbus simulator 87*m* (Block 760). Accordingly, at this point, the Modbus simulators 87*m*, 87*s*, of the master node 80 and slave node 81 may synchronize the relevant register data contained within its status and historical repositories 415, 414. This synchronization process has been described above and is perhaps best illustrated in FIG. 6C. Once the updated data has been transferred from the slave Modbus simulator 87*s* to the master Modbus simulator 87*m*, the master Modbus simulator 87*m* may update its status repository 415 to reflect changes in the slave Modbus simulator 87*s* status repository 415 (Block 764).

Once the master Modbus simulator 87*m* has received the updated register data, it may wait until the host system 82 again polls for register data from a Modbus device 89 (Block 770). Upon this polling, the master Modbus simulator 87*m* may accept the polling request for register data of specified registers (Block 774). Thereafter, the master Modbus simulator 87*m* may return the requested register data to the host system 82 (Block 780), which may include the updated register data reported by the Modbus device 89 in the slave node 81. This data communication has been described in more detail above and is perhaps best illustrated in FIG. 60. The data transmission path ends at Block 790.

The operations of Blocks 770 and 774 are substantially identical to the operations of Blocks 720 and 730. A person of skill in the art will appreciate that, due to the nature of the Modbus protocol, substantially all communications occur as a request from a master device, followed by a response from a slave device. In a traditional Modbus system, a master device is not aware of what device may accept the polling request and return the requested register data. For the operation illustrated by Blocks 774 and 780, the Modbus simulator 87 emulates a Modbus device 89. Likewise, for the operations illustrated by Blocks 740 and 750, the Modbus simulator 87 emulates a host system 82. In these instances, the actual host system 82 and actual Modbus device 89 are unable to discern that each respective device is not communicating directly with the other.

Although FIG. 7 illustrates the data transmission path from a host system 82 request to a response received by the host system 82, the system does not actually operate in a linear line of data transmission. The data communication illustrated by FIG. 7, and the description related thereto, may actually occur over several various communication loops. These separate loops may act to synchronize data independently of each other, but cooperatively synchronize data through the entire system, as well. These communication loops are described in greater detail below. The linear path illustrated in the flow chart 700 of FIG. 7 is exemplary in nature and purposefully depicted in a simplistic fashion.

Figure 8:
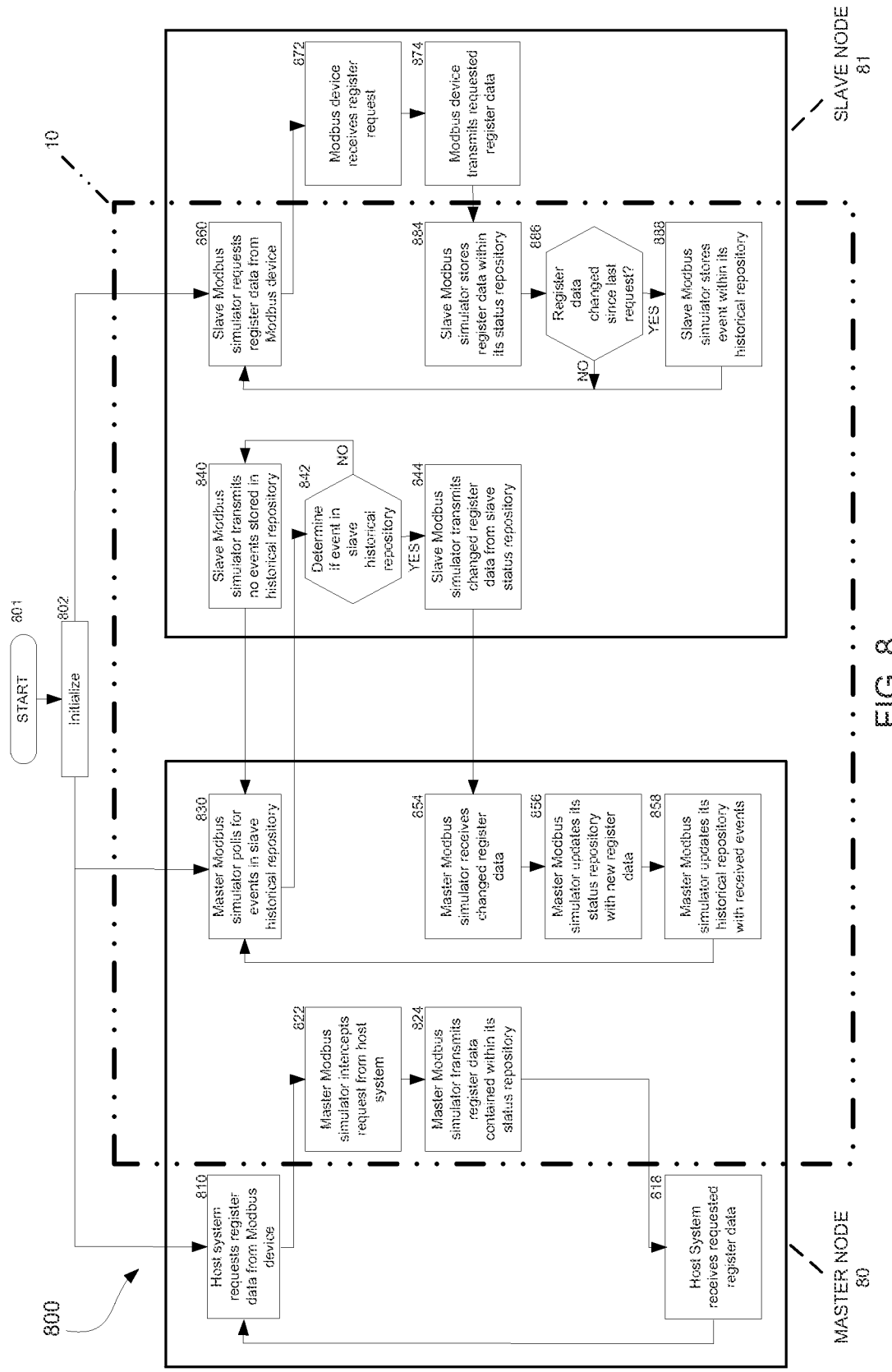
FIG. 8 is a flow chart illustrating the simultaneous communication loops that operate within the Modbus simulator system, in accordance with embodiments of the present invention.

FIG. 8 illustrates an embodiment of the present invention wherein multiple communication loops may be used to synchronize data across the entire Modbus simulator system 10. For illustrative and exemplary purposes, this figure depicts three systems, as may be present in an embodiment of the present invention. A person of skill in the art will appreciate varying numbers of systems that may include communication loops, operating separately and/or jointly, which may exist within the scope and spirit of the present invention. The systems of the present invention may include the master node 80, the slave node 81, and the Modbus simulator system 10 of the present invention. For simplicity, the operations presented by FIG. 8 represent the ongoing communication loops, as they may occur, after all initializations have occurred.

The first communication loop of the present embodiment may occur within the master node 80. From the start (Block 801), the system is initialized at Block 802. Operation within the master node 80 will now be described in greater detail. After the system is initialized at Block 802, the host system 82 may request register data from a Modbus device 89 (Block 810). This register data request may be accepted by the master Modbus simulator 87*m* (Block 822). The master Modbus simulator 87*m* may then return the register data, as it may currently be stored in its status repository 415, to the host system 82 (Block 824). The host system 82 then may receive the register data from the master Modbus simulator 87*m* (Block 818), completing one cycle of data communication loop. Subsequent cycles of this communication loop may occur continually, beginning at the operation described by Block 810.

The next communication loop of the present embodiment may occur between the Modbus simulators 87*m*, 87*s* of the master node 80 and the slave node 81. At Block 830, the master Modbus simulator 87*m* may poll the slave Modbus simulator 87*s* for events present in its historical repository 414. The slave Modbus simulator 87*s* may then determine if a new event has occurred since the last polling operation (Block 842). If no new event has been occurred, the slave Modbus simulator 87*s* may transmit to the master Modbus simulator 87*s* that no events are stored in the historical repository at Block 840, thereby indicating that no changes have occurred to the register data in the status repository 415 since the last polling operation. Alternately, if an event has occurred since the last polling operation, the slave Modbus simulator 87*s* may transmit the changed register data from the slave status repository 415 to the master Modbus simulator 87*m* (Block 844). The register data may be received by the master Modbus simulator 87*m* (Block 854). The master Modbus simulator 87*m* may then update its status repository 415 with the new register data to reflect the changes received during the aforementioned data transmission (Block 856). The master Modbus simulator 87*m* may also update its historical data repository 414 with the received events to reflect the aforementioned data transmission (Block 858). Subsequent cycles of this communication loop may occur continually, as the next cycle of this communication loop may, again, begin at the operation described by Block 830.

Another communication loop of the present embodiment may occur between the slave Modbus simulator 87*s* and the Modbus device 89. At Block 860, the slave Modbus simulator 87*s* may request register data from a Modbus device 89. This register data request may be received by the Modbus device 89 (Block 872). The Modbus device 89 may then transmit the requested register data currently stored within the memory of the Modbus device 89 (Block 874). The slave Modbus simulator 87*s* may then receive the register data and store the received register data within its status repository 415 (Block 884). The slave Modbus simulator 87*s* may next analyze the newly received register data to determine if the register data has changed since the last request for the transmission of register data was made by the slave Modbus simulator 87*s* (Block 886). If no changes have occurred since the last transmission, the program may return to the operation of Block 860. If the register data has changed since the last data transmission, the slave Modbus simulator 87*s* may create and store an event in the historical repository 414 (Block 888). Thereafter, the program may return to the operation of Block 860.

Subsequent cycles of this communication loop may occur continually beginning at the operation described in Block 860.

After the slave Modbus simulator 87s has updated its status repository 415 with the register data received by the Modbus device 89 (as illustrated in Block 884), the slave Modbus simulator 87s may return the updated register data in response to subsequent requests from the master Modbus simulator 87m (as illustrated in Block 844). Likewise, after the master Modbus simulator 87m has updated its status repository with the register data received from the slave Modbus simulator 87s (as illustrated in Block 854), the master Modbus simulator 87m may return the updated register data in response to subsequent requests from the host system 82 (as illustrated in Block 824). As a result, the host system 82 in the master node 80 may receive updated register data generated by the Modbus device 89 in the slave node 80 by passing the register data through the various communication loops.

In at least one embodiment of the present invention, the modbus simulator 87 may be configured to receive data requests for multiple register values, associated with at least one Modbus device 89. Such requests may be in the form of a request for a range of contiguous registers, by specifying a beginning register address and an ending register address, wherein the queried Modbus device 89 would be capable of returning the value of each register falling within the range requested. As another non-limiting example, data requests may comprise a list of individual register addresses, wherein the Modbus device 89 would be configured to return the value of each register specified in the list of register addresses. In one embodiment, the registers included within the polling operation are the registers that have been previously requested by the host system of the master node.

As previously discussed, the Modbus simulator system 10 of the present invention may include several repositories, which may further include one or more tables and/or registers. These tables utilize Modbus registers that are not traditionally used by the direct input/output ("I/O") operations of the Modbus protocol. As a result, the register table may be located at different register address for different implementations.

The status repository 415 of the Modbus simulator system 10 may use the same register address as the traditional I/O operational registers for local I/O operations. To access and perform I/O operations from attached lower tier devices, such as Modbus devices 89 connected to the Modbus simulator 87, the Modbus simulator system 10 may address these registers by using a register offset. A person of skill in the art will realize that additional and different register offsets may be used for each connected device. A person of skill in the art will additionally realize that different register offsets may be used for devices connected at subsequent lower tiers.

The historical repository 414 may include additional registers to collect and store the data of the events for the connected devices, i.e. Modbus devices 89. The historical repository 414 may organize the events contained therein as a queue, although a person of skill in the art will realize additional memory storage techniques, such as stacks, which are within the scope and spirit of the disclosed invention.

In an embodiment that uses a queued data storage structure, the historical repository 414 may include a plurality of sequential bytes to represent the data stored therein. A skilled artisan will realize that the Modbus simulator system 10 of the present invention may use a data storage element of any size, such as, but not limited to, bits, nibbles, bytes, words, long words, 10-bit, n-bit, etc., and be included within the scope and spirit of the present invention.

The historical repository 414 may include a predetermined number of initial bytes which may determine the current status of the historical repository 414. These bytes may be used to determine the size of each data element, report the number of events that have occurred since the last time the data was polled, the time the last report was transmitted, and other relevant status related information.

Located after an initial series of bytes used to determine the current status of the historical repository 414, records of each event may be recorded in subsequent series of bytes. Each event may be stored as a fixed number of bytes sufficient to include event data. Such event data may include the type of event that occurred, the time of the event, the point address to the data located in another table, and the point value of the data located in another table. A person of skill in the art, after having the benefit of this disclosure, will appreciate additional data entries related to details about an event that has occurred. The point address and point data may refer to the status data included within the status repository 415. Events may be stored and defined by using a code number (such as a hexadecimal number) to represent events. In an example where the first byte of an event is the type of event, the first byte may be set to "2B," which could correspond to an analog sensor failure of a connected Modbus device 89. A skilled artisan will realize that any number of event codes could be associated to a type of event, especially with larger sized data elements (i.e. word, double word, etc.), A person of skill in the art will also realize additional characteristics that may be desired to be included in the historical repository 414, which are intended to be included within this disclosure.

The Modbus simulator system 10 of the present invention may also include a configuration repository 416. The configuration repository 416 may store the settings that determine the operational protocols of the Modbus simulator system 10. These settings may be applied, as an illustration, to instruct the device as to which data values to collect and the frequency of which the status repository 415 and/or historical repository 414 may be updated. A person of skill in the art will realize a plurality of additional settings and configurations that may be included in the configuration repository 416, which are within the scope and spirit of the present invention.

The preceding illustrative register table structure has been presented to provide an example implementation of a register table structure, in accordance with an embodiment of the present invention. A person of skill in the art will appreciate that the values, flags, and data included within the preceding registers may be reorganized and manipulated while still remaining within the scope and spirit of the present invention.

The registers synchronized between Modbus simulators 87 may be remembered via a learning system. In this embodiment, the master Modbus simulator 87m may only request changed data from the slave Modbus simulator 87s for a selected set of registers to be monitored. In an additional embodiment, the Modbus simulators 87 may keep a table of registers that have historically been requested by the host system 82. In an additional embodiment, each instance wherein the host system 82 requests the transmission of data contained within a register that had not previously been monitored, the Modbus simulators 87 may remember to synchronize the additional registers during every subsequent polling operation. In another embodiment, the registers selected for synchronization may be predetermined by a user.

The repositories included in the nodes of the Modbus simulator system 10 may be configured to receive operational updates. Updates may be authorized by and written to the configuration repository 416. In additional embodiments, the program updates can be sent directly to specific components and/or nodes connected to the Modbus simulator system 10 of the present invention. Alternately, the update may be broadcast to all connected components and/or nodes to the Modbus simulator system 10 of the present invention.

The Modbus simulator system 10 may include a data lock capability. If included and engaged, the data lock capability may require the components of the Modbus simulator system 10 to authorize a write operation by comparing the location subject to the write operation to a setting in the configuration repository 416. In additional embodiments, a byte in the configuration repository 416 may operate as a flag that defines whether the device is locked or unlocked. The remaining bytes may contain one or more security keys. The security key may comprise random 32 bit numbers, but a person of skill in the art will realize alternate methods to authenticate a transmission within the scope of this invention. As a non-limiting example, to lock or unlock the data, the random number may be required to be read, encoded, authenticated, and rewritten. If this process does not complete within a predetermined time period, the memory may lock.

The data storage device 401 may exist as a standalone device. The low speed connection interface 405, by which the master node 80 communicates with the slave node 81 via a low speed connection 85 may be a separate device. The low speed connection interface 405 may be detached from the remaining structure of the Modbus simulator 87. In an additional embodiment, the disconnected low speed connection interface 405 may be connected to the Modbus simulator 87 via a high speed connection 88.

The high speed connection 88 may be transmitted via a serial or network connection, such as, but not limited to, an intranet, virtual private network, or the internet. A person of skill in the art will further realize that the first communications network may be connected via wired, wireless, or other suitable connection types. The low speed connection 85 may similarly be connected via wired, wireless, or other suitable connection types.

In one embodiment of the present invention, the host system 82 may be provided by any device that is capable of displaying user-readable information and receiving user-provided commands and input. As a non-limiting example, a host system 82 may be provided by a computing device having a monitor and/or printer for delivering information concerning the state of slave nodes 81, such as the computer system 101, a personal computer (PC) or network server, as understood by those having skill in the art. Other examples of possible user interfaces include laptops, mobile devices, handheld devices, personal data assistants (PDAs), or even simply a standard web browser application executing on a network device. The Modbus simulator 87 may include multiple node storage devices 401, multiple node memory modules 402, or any combination thereof.

Many modifications and other embodiments of the present invention will come to the mind of one skilled in the art having the benefit of the teachings presented in the foregoing descriptions and the associated drawings. Therefore, it is understood that the invention is not to be limited to the specific embodiments disclosed.

That which is claimed is:

1. A data transmission system comprising:
   a master node comprising
      a master modbus simulator,
      a host system in communication with the master modbus simulator, and
      a communication interchange in communication with the master modbus simulator;
   a slave node comprising
      a slave modbus simulator,
      a communication interchange in communication with the slave modbus simulator, and
      at least one modbus device in communication with the slave modbus simulator;
   wherein the slave modbus simulator includes a status repository to store register data reported by the at least one modbus device, and a historical repository that stores historical events, wherein historical events are defined as register data stored on the status repository that has changed;
   wherein the master modbus simulator includes a status repository to store the register data received from the slave modbus simulator and a historical repository to store the historical events received from the slave modbus simulator;
   wherein the communication interchange of the slave node is in communication with the communication interchange of the master node;
   wherein the master node is configured by transmitting a query from the host system to the master modbus simulator to determine the register data that is required from the at least one modbus device connected to the slave modbus simulator;
   wherein the master node is initialized initializes by receiving the register data from the status repository on the slave modbus simulator;
   wherein the register data is related to a status of the at least one modbus device; and
   wherein, after the master node is configured and initialized, the historical events are transmitted from the historical repository of the slave modbus simulator to the historical repository of the master modbus simulator.

2. A system according to claim 1 wherein the communication interchange of the slave node is in communication with the communication interchange of the master node over a low speed connection.

3. A system according to claim 1 wherein the at least one modbus device is in communication with the slave modbus simulator over a high speed connection.

4. A system according to claim 3 wherein the high speed connection is provided by at least one of a network connection and a serial connection.

5. A system according to claim 1 wherein the master modbus simulator transmits a synchronization request to the slave modbus simulator; and wherein the historical events stored in the historical repository of the salve modbus simulator are transmitted to the master node to be stored on the historical repository of the master modbus simulator responsive to the synchronization request.

6. A system according to claim 5 wherein the historical events that are transmitted from the historical repository of the slave modbus simulator to the historical repository of the master modbus simulator are limited to the historical events that have occurred since a previous synchronization request has occurred.

7. A system according to claim 1 wherein the communication interchange of the slave node and the communication interchange of the master node are provided by a radio.

8. A system according to claim 1 wherein the slave modbus simulator requests register data from the at least one modbus device and stores the register data on the status repository of the slave modbus simulator.

9. A system according to claim 1 wherein the slave node comprises a plurality of slave nodes.

10. A system according to claim 1 kg/herein the at least one modbus device in communication with the slave modbus simulator comprises a plurality of modbus devices.

11. A system according to claim 1 further comprising a radio repeater to extend reception of data transmitted between the master node and the slave node.

12. A system according to claim 1 wherein communication between the master modbus simulator and the slave modbus simulator is carried out using a wireless mesh network.

13. A system according to claim 1 wherein the historical events are transmitted from the historical repository of the slave modbus simulator to the historical repository of the master modbus simulator at set intervals.

14. A system according to claim 13 wherein the historical events that are transmitted from the historical repository of the slave modbus simulator to the historical repository of the master modbus simulator are limited to the historical events that have occurred since a previous interval.

15. A system according to claim 1 wherein multiple modbus devices are in communication with the slave modbus simulator using serial connections; wherein a modbus simulator is operable as a master modbus simulator when receiving data from a modbus simulator of a slave node; and wherein a modbus simulator is operable as a slave modbus simulator when transmitting data to a master node.

16. A system according to claim 15 wherein the register data that is stored on the status repository is stored on a status repository that is reserved for register data that has been received at the master node, after receiving the register data from the slave node.

17. A system according to claim 16 wherein transmission of the register data stored on the status repository that is reserved for the register data that has been received at the master node causes the master node to become the slave node.

18. A method of transmitting data comprising:
receiving register data from at least one modbus device in communication with a slave modbus simulator through a communication interchange, wherein the register data is received at a status repository of the slave modbus simulator from the at least one modbus device connected to the slave modbus simulator, wherein the status repository is carried by a slave node, wherein the status repository of the slave modbus simulator stores the register data reported by the at least one modbus device, and wherein the slave modbus simulator includes a historical repository to store historical events that are defined as changes to the register data that is stored on the status repository;
configuring a master node which comprises a master modbus simulator, a host system in communication with the master modbus simulator, and a communication interchange in communication with the master modbus simulator, wherein configuring the master node includes transmitting a query from the host system to the master modbus simulator to determine the register data that is required from the at least one modbus device connected to the slave modbus simulator;
initializing the master node by receiving the register data from the status repository of the slave node, wherein the master modbus simulator includes a status repository to store the register data received from the slave modbus simulator and a historical repository to store the historical events received from the slave modbus simulator;
transmitting the historical repository of the slave modbus simulator to the historical repository of the master modbus simulator after the master node is configured and initialized;
wherein the communication interchange of the slave node is in communication with the communication interchange of the master node; and
wherein the register data is related to a status of the at least one modbus device.

19. A method according to claim 18 wherein the communication interchange of the slave node is in communication with the communication interchange of the master node over a low speed connection.

20. A method according to claim 18 wherein the at least one modbus device is in communication with the slave modbus simulator over a high speed connection.

21. A method according to claim 20 wherein the high speed connection is provided by at least one of a network connection and a serial connection.

22. A method according to claim 18 further comprising transmitting a synchronization request from the master modbus simulator to the slave modbus simulator; and transmitting the historical events stored in the historical repository of the salve modbus simulator to the master node to be stored on the historical repository of the master modbus simulator responsive to the synchronization request.

23. A method according to claim 22 wherein the historical events that are transmitted from the historical repository of the slave modbus simulator to the historical repository of the master modbus simulator are limited to the historical events that have occurred since a previous synchronization request has occurred.

24. A method according to claim 18 wherein the communication interchange of the slave node and the communication interchange of the master node are provided by a radio.

25. A method according to claim 18 further comprising the slave modbus simulator requesting register data from the at least one modbus device and storing the register data on the status repository of the slave modbus simulator.

26. A method according to claim 18 wherein the slave node comprises a plurality of slave nodes.

27. A method according to claim 18 wherein the at least one modbus device in communication with the slave modbus simulator comprises a plurality of modbus devices.

28. A method according to claim 18 further comprising extending reception data transmitted between the master node and the slave node using a radio repeater.

29. A method according to claim 18 wherein communication between the master modbus simulator and the slave modbus simulator is carried out using a wireless mesh network.

30. A method according to claim 18 further comprising transmitting the historical events from the historical repository of the slave modbus simulator to the historical repository of the master modbus simulator at set intervals.

31. A method according to claim 30 wherein the historical events that are transmitted from the historical repository of the slave modbus simulator to the historical repository of the master modbus simulator are limited to the historical events that have occurred since a previous interval.

32. A method according to claim 18 wherein multiple modbus devices are in communication with the slave modbus simulator using serial connections; and further comprising operating a modbus simulator as a master modbus simulator when receiving data from a modbus simulator of a slave node; and operating a modbus simulator as a slave modbus simulator when transmitting data to a master node.

33. A method according to claim 32 further comprising storing the register data that is stored on the status repository on a status repository that is reserved for register data that has been received at the master node, after receiving the register data from the slave node.

34. A method according to claim 33 further comprising converting the master node to the slave node upon transmission of the register data stored on the status repository that is reserved for the register data that has been received at the master node.

35. A method of transmitting data comprising:
receiving register data from a plurality of modbus devices in communication with a slave modbus simulator over a high speed connection through a communication interchange to a status repository of the slave modbus simulator, wherein the status repository of the slave modbus simulator stores the register data transmitted by the plurality of modbus devices, and wherein the slave modbus simulator includes a historical repository to store historical events that are defined as changes to the register data that is stored on the status repository;
configuring a master node which comprises a master modbus simulator, a host system in communication with the master modbus simulator, and a communication interchange in communication with the master modbus simulator, wherein configuring the master node includes transmitting a query from the host system to the master modbus simulator to determine the register data that is required from the plurality of modbus devices connected to the slave modbus simulator;
initializing the master node by receiving the register data from the status repository of the slave node, wherein the master modbus simulator includes a status repository to store the register data received from the slave modbus simulator and a historical repository to store the historical events received from the slave modbus simulator;
transmitting a synchronization request from the master modbus simulator to the slave modbus simulator;
transmitting the historical events stored in the historical repository of the salve modbus simulator to the historical repository of the master modbus simulator responsive to the synchronization request;
wherein the historical events that are transmitted from the historical repository of the slave modbus simulator to the historical repository of the master modbus simulator are limited to the historical events that have occurred since a previous synchronization request has occurred;
wherein the communication interchange of the slave node is in communication with the communication interchange of the master node over a low speed connection; and
wherein the register data is related to a status of the plurality of modbus devices.

36. A method according to claim 35 wherein the high speed connection is provided by at least one of a network connection and a serial connection; and wherein the communication interchange of the slave node and the communication interchange of the master node are provided by a radio.

37. A method according to claim 35 further comprising the slave modbus simulator requesting register data from the plurality of modbus devices and storing the register data on the status repository of the slave modbus simulator.

38. A method according to claim 35 wherein the slave node comprises a plurality of slave nodes.

39. A method according to claim 35 further comprising extending reception data transmitted between the master node and the slave node using a radio repeater.

40. A method according to claim 35 wherein communication between the master modbus simulator and the slave modbus simulator is carried out using a wireless mesh network.

41. A method according to claim 35 further comprising transmitting the historical events from the historical repository of the slave modbus simulator to the historical repository of the master modbus simulator at set intervals; and wherein the historical events that are transmitted from the historical repository of the slave modbus simulator to the historical repository of the master modbus simulator are limited to the historical events that have occurred since a previous interval.

42. A method according to claim 35 wherein the plurality of modbus devices are in communication with the slave modbus simulator using serial connections; and further comprising operating a modbus simulator as a master modbus simulator when receiving data from a modbus simulator of a slave node; and operating a modbus simulator as a slave modbus simulator when transmitting data to a master node.

43. A method according to claim 42 further comprising storing the register data that is stored on the status repository on a status repository that is reserved for register data that has been received at the master node, after receiving the register data from the slave node.

44. A method according to claim 43 further comprising converting the master node to the slave node upon transmission of the register data stored on the status repository that is reserved for the register data that has been received at the master node.

* * * * *